(12) United States Patent
Roy

(10) Patent No.: US 12,062,767 B1
(45) Date of Patent: Aug. 13, 2024

(54) DUAL UNDERSIDE FAN SYSTEM FOR HEAT TRANSFER AND FOR GENERATING DIFFERENTIAL GROUND-EFFECT DOWNFORCE FOR VEHICLE

(71) Applicant: Matthew MacGregor Roy, Montreal (CA)

(72) Inventor: Matthew MacGregor Roy, Montreal (CA)

( * ) Notice: Subject to any disclaimer, the term of this patent is extended or adjusted under 35 U.S.C. 154(b) by 506 days.

(21) Appl. No.: 17/523,645

(22) Filed: Nov. 10, 2021

Related U.S. Application Data

(60) Provisional application No. 63/122,082, filed on Dec. 7, 2020.

(51) Int. Cl.
*B60L 58/26* (2019.01)
*B60K 1/04* (2019.01)
*B60K 11/06* (2006.01)
*B60K 11/08* (2006.01)
*H01M 10/613* (2014.01)
*H01M 10/625* (2014.01)
*H01M 10/63* (2014.01)
*H01M 10/6563* (2014.01)
*H01M 10/6566* (2014.01)
(Continued)

(52) U.S. Cl.
CPC .............. *H01M 10/625* (2015.04); *B60K 1/04* (2013.01); *B60K 11/06* (2013.01); *B60K 11/085* (2013.01); *B60L 58/26* (2019.02); *H01M 10/613* (2015.04); *H01M 10/63* (2015.04); *H01M 10/6563* (2015.04); *H01M 10/6566* (2015.04); *B60K 2001/005* (2013.01); *B62D 37/02* (2013.01); *H01M 2220/20* (2013.01)

(58) Field of Classification Search
CPC .. H01M 10/625; H01M 10/613; H01M 10/63; H01M 10/6563; H01M 10/6566; H01M 2220/20; B60K 1/04; B60K 11/06; B60K 11/085; B60K 2001/005; B60L 58/26; B62D 37/02
See application file for complete search history.

(56) References Cited

U.S. PATENT DOCUMENTS

| 10,632,857 B2 * | 4/2020 | Matecki | .................. B60L 50/64 |
| 10,661,646 B2 * | 5/2020 | Matecki | .................. B60L 50/66 |

(Continued)

FOREIGN PATENT DOCUMENTS

| DE | 102012223548 B4 * | 1/2016 | ............... B60K 1/04 |
| EP | 1479567 A1 * | 11/2004 | ............... B60K 1/04 |

*Primary Examiner* — Justin Holmes

(57) ABSTRACT

An electric vehicle includes a chassis, a battery in a battery compartment supported by the chassis and a dual underside battery cooling system to transfer heat from the battery by drawing hot air from the battery compartment via air outlets. The dual underside battery cooling system includes a left fan for generating a left airflow along a left underside path of the vehicle and a right fan for generating a right airflow along a right underside path of the vehicle, the left and right airflows expelling the hot air from the battery compartment toward a rear of the vehicle. The processor independently controls the left fan and the right fan to selectively generate a differential downforce on left and right wheels of the vehicles when cornering to thereby compensate for centrifugal roll and to generate an equal downforce on the left and right wheels when accelerating in a straight line.

20 Claims, 22 Drawing Sheets

(51) Int. Cl.
*B60K 1/00* (2006.01)
*B62D 37/02* (2006.01)

(56) References Cited

U.S. PATENT DOCUMENTS

| | | | | |
|---|---|---|---|---|
| 2013/0122338 | A1* | 5/2013 | Katayama | H01M 10/613 |
| | | | | 429/83 |
| 2017/0352929 | A1* | 12/2017 | Yasuda | B60L 50/64 |
| 2018/0237075 | A1* | 8/2018 | Kawabe | B60L 50/66 |

* cited by examiner

DUAL UNDERSIDE FAN SYSTEM FOR HEAT TRANSFER AND FOR GENERATING DIFFERENTIAL GROUND-EFFECT DOWNFORCE FOR VEHICLE

CROSS-REFERENCE TO RELATED APPLICATIONS

This application claims priority from U.S. Provisional Patent Application 63/122,082 filed Dec. 7, 2020.

TECHNICAL FIELD

The present invention relates generally to vehicles and, in particular, to electric vehicles whose batteries require cooling.

BACKGROUND

Electric vehicles have a rechargeable battery or battery pack typically installed at a bottom or lower portion of the chassis to provide electrical energy to the drive motor and other onboard systems. The battery must be cooled because it generates waste heat when electrical current is drawn from the battery. Various battery cooling systems are known in the art. In a battery cooling system that uses airflow for heat transfer, it would be desirable to use the airflow in a manner that aerodynamically enhances the vehicle's performance when accelerating or cornering.

SUMMARY

In general, embodiments of the present invention provide an electric vehicle, which may be an autonomous electric vehicle, that has a dual underside battery cooling system to transfer heat from the battery by drawing hot air from the battery compartment via air outlets using first and second fans. The fans also evacuate air from beneath the vehicle to selectively provide differential downforce on the left and right wheels in order to offset the centrifugal roll of the vehicle when cornering. The vehicle may provide equal downforce when accelerating in a straight line. The fans thus provide both air venting to cool the battery and also ground-effect downforce for the vehicle.

An aspect of the disclosure is an electric vehicle having a chassis, a battery supported by the chassis, and a dual underside battery cooling system to transfer heat from the battery, the dual underside battery cooling system including a left fan for generating a left airflow along a left underside path of the vehicle and a right fan for generating a right airflow along a right underside path of the vehicle, the left and right airflows transferring heat from the battery. The vehicle also includes a processor for independently controlling the left fan and the right fan to selectively generate a differential downforce on left and right wheels of the vehicles when cornering to thereby compensate for centrifugal roll and to generate an equal downforce on the left and right wheels when accelerating in a straight line.

Another aspect of the disclosure is an electric vehicle that includes a chassis, a battery in a battery compartment supported by the chassis and a dual underside battery cooling system to transfer heat from the battery by drawing hot air from the battery compartment via air outlets. The dual underside battery cooling system includes a left fan for generating a left airflow along a left underside path of the vehicle and a right fan for generating a right airflow along a right underside path of the vehicle, the left and right airflows expelling the hot air from the battery compartment toward a rear of the vehicle. The processor independently controls the left fan and the right fan to selectively generate a differential downforce on left and right wheels of the vehicles when cornering to thereby compensate for centrifugal roll and to generate an equal downforce on the left and right wheels when accelerating in a straight line.

Yet another aspect of the disclosure is an autonomous electric vehicle having a body, a battery in a battery compartment within the body and a dual underside battery cooling system to transfer heat from the battery by drawing hot air from the battery compartment via air outlets, the dual underside battery cooling system including a left fan for generating a left airflow along a left underside path of the vehicle and a right fan for generating a right airflow along a right underside path of the vehicle, the left and right airflows expelling the hot air from the battery compartment toward a rear of the vehicle. The vehicle also includes a vehicle dynamics prediction module executed by a processor to predict a vehicle dynamics condition and to generate control signals to control the left and right fans pre-emptively prior to the vehicle dynamics condition occurring, wherein the processor independently controls the left fan and the right fan to generate a differential downforce on left and right wheels of the vehicles when cornering to thereby compensate for centrifugal roll.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which:

FIG. 15A depicts a movable louver having a heat exchanger coil.

It will be noted that throughout the appended drawings, like features are identified by like reference numerals.

DETAILED DESCRIPTION

Figure 1:
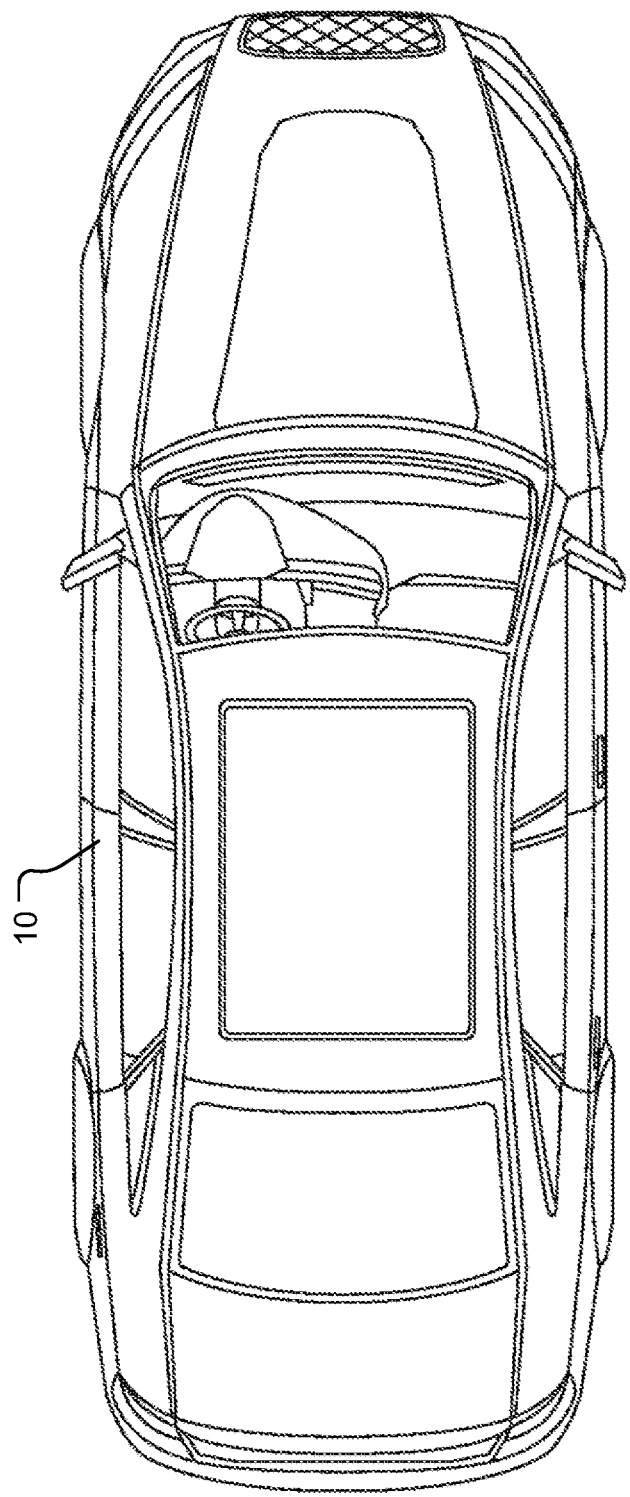
FIG. 1 is a top view of an autonomous electric vehicle in accordance with an embodiment of the present invention.
Figure 2:
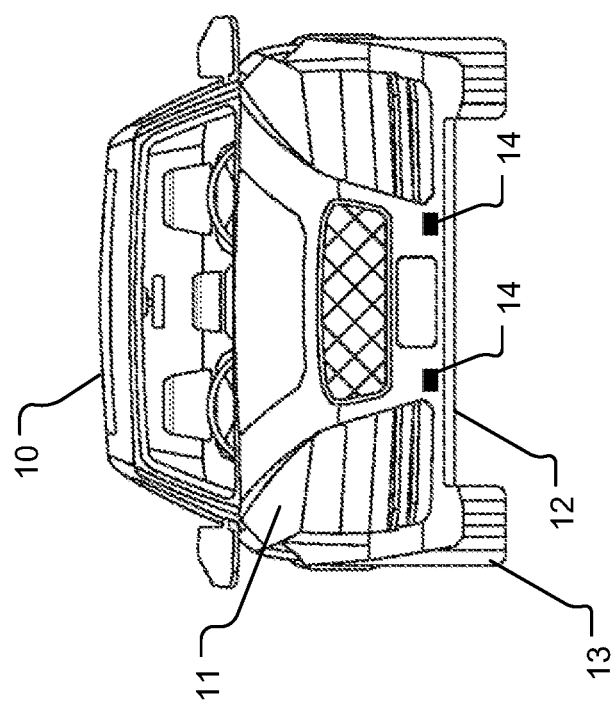
FIG. 2 is a front view of the vehicle of FIG. 1.
Figure 3:
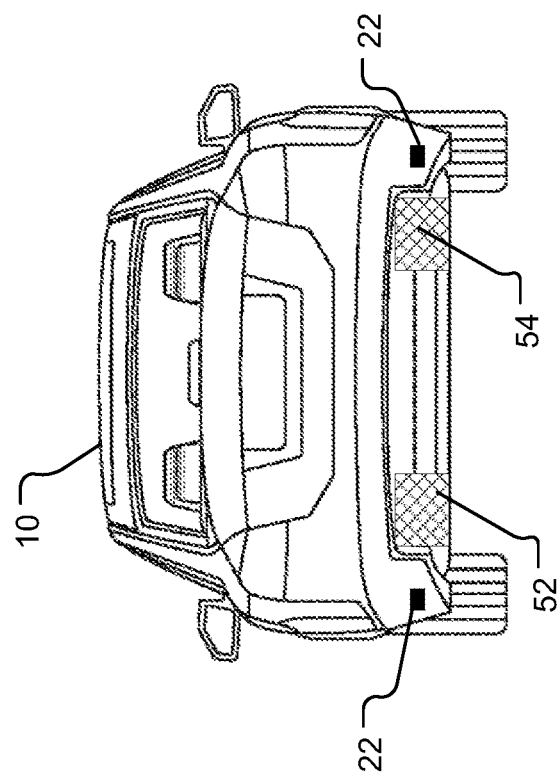
FIG. 3 is a rear view of the vehicle of FIG. 1.

Disclosed herein are various embodiments of an electric vehicle, which may be an autonomous electric vehicle, having a dual underside battery cooling system to transfer heat from the battery using first and second fans that also function to evacuate air from beneath the vehicle to selectively provide differential downforce on the left and right wheels in order to offset the centrifugal roll of the vehicle when cornering. The dual fans of the vehicle may also provide equal downforce when accelerating in a straight line. The fans thus provide both convective heat transfer to cool the battery and also ground-effect downforce for the vehicle.

FIGS. 1-5 depict one exemplary implementation of an autonomous electric vehicle 10 (AV), i.e. a self-driving vehicle. The embodiments of this invention may be applied or adapted to a human-driven vehicle or a mixed-mode vehicle that has an assisted-driving system for partially driving the vehicle 10 in conjunction with driver input. The autonomous vehicle 10 may be purely electric or hybrid-electric. The vehicle 10 includes, in the illustrated embodiment, a vehicle chassis 12, and a plurality of wheels 13. The chassis may include or support a body 11. The chassis is any frame or structure that supports the passenger cabin and battery. The vehicle 10 includes an electric motor supported by the chassis and mechanically connected to one or more of the wheels for providing traction to the one or more of the wheels. The vehicle 10 includes a braking system and a steering system for steering the vehicle via a steering mechanism. The vehicle may include a powertrain to transfer power from the motor to the drive wheels. For some vehicles, the powertrain may include, in addition to the motor (engine), a transmission gearbox, a drive shaft, and a differential. The electric vehicle includes a rechargeable battery 30 or plurality of rechargeable batteries (or battery pack). The battery or battery pack may be made of lithium-polymer (LiPo), lithium-ion (Li-ion), nickel metal hydride (NiMH), nickel cadmium (NiCd), graphene, or other equivalent type.

For the purposes of this specification, the term "vehicle" is meant to encompass any land-based vehicle such as a car (sedan, station wagon, hatchback, etc.), van, minivan, sports utility vehicle (SUV), crossover-type vehicle, bus, minibus, truck, tractor-trailer, semi-trailer.

The terms "autonomous vehicle" and "self-driving vehicle" are meant to synonymously encompass any vehicle having environment-detecting sensors and a processor 100 or other controller, computer, computing device or computer system for autonomously steering, accelerating and braking the vehicle, i.e. self-driving or driving autonomously, without a driver physically touching, interacting with or providing input to the steering wheel, accelerator pedal and brake pedal. The vehicle of FIGS. 1-5 also includes a plurality of sensors i.e. environment-detecting sensors. The sensors may include RADAR, LIDAR, cameras and ultrasonic rangefinders. The processor 100 is configured to receive analog or digital signals (data) from the sensors and to generate steering, acceleration and braking control signals for controlling the steering system, the motor and the braking system of the vehicle. The processor may generate a steering control signal, an acceleration control signal and a braking control signal based on the signals received from the sensors. The processor may also generate other control signals for other subsystems and equipment on the vehicle, e.g. a turn indicator light control signal, a horn control signal, a headlight control signal, a transmission selector signal, an ignition shutoff signal, an ignition start-up signal, a door lock signal, a door unlock signal, a sunroof open signal, a sunroof close signal, a climate control signal, a seat heater signal, a windshield defroster signal, a windshield wiper activation signal, a wiper fluid squirt signal, to name but a few.

The processor 100 may be any microprocessor, computer, computing device, or microcontroller. As will be appreciated, in a variant, there may be multiple processors or computers working together, e.g. networked together via data buses, communication cables, or wireless links to share computational loads or to perform different tasks. In one embodiment, as depicted by way of example in FIGS. 1-5, the vehicle comprises a self-driving computer or computing device that has a microprocessor (e.g. processor 100) operatively coupled to a memory 102, e.g. a flash memory and/or random access memory (RAM). The memory may store system data, configuration files and user-related data. There may be multiple memory devices in the vehicle. In a variant, data may be stored in a cloud-based memory accessible by the vehicle.

The processor 100 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processor may be part of a computing system that includes a chipset for controlling communications between the one or more processors and one or more of the other components of the system. The one or more processors may also include one or more application-specific integrated circuits (ASICs) or application-specific standard products (ASSPs) for handling specific data processing functions or tasks.

The memory 102 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or any suitable combination thereof.

Figure 4:
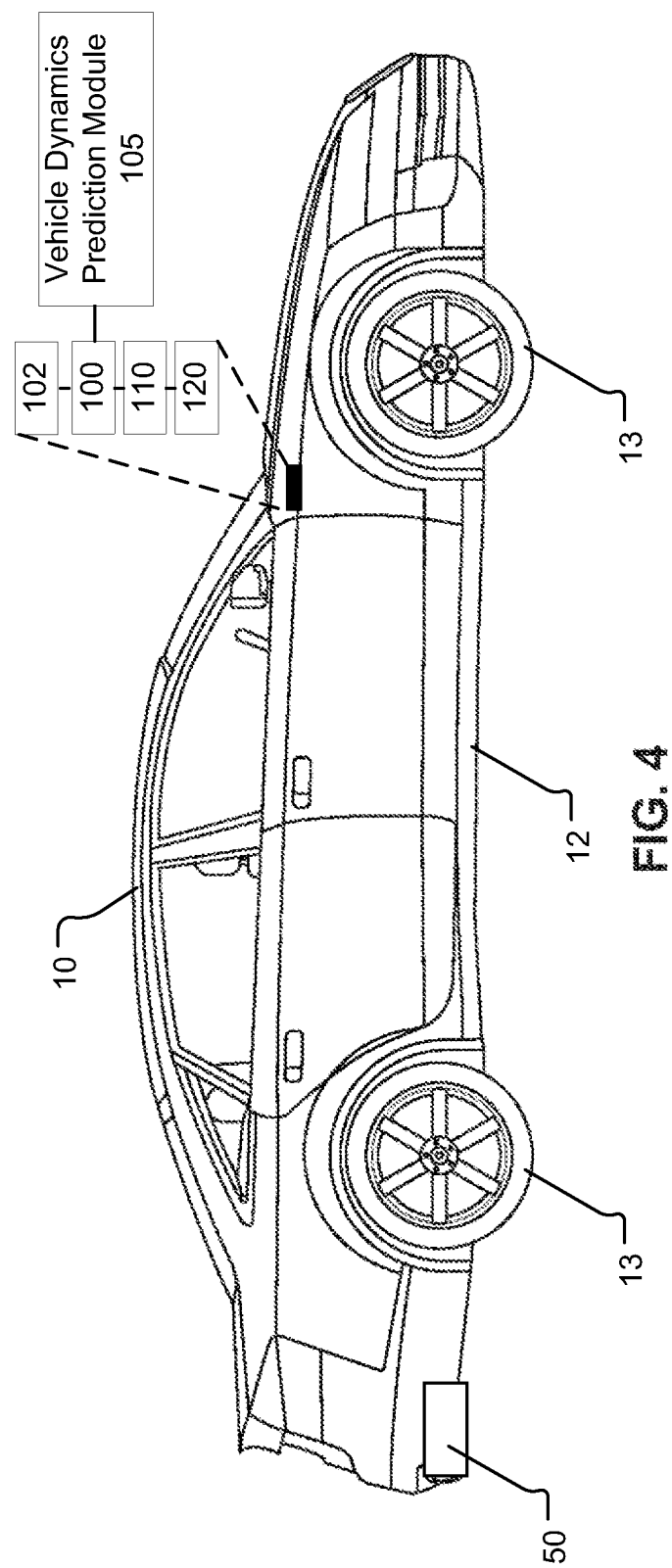
FIG. 4 is a right side view of the vehicle of FIG. 1.
Figure 5:
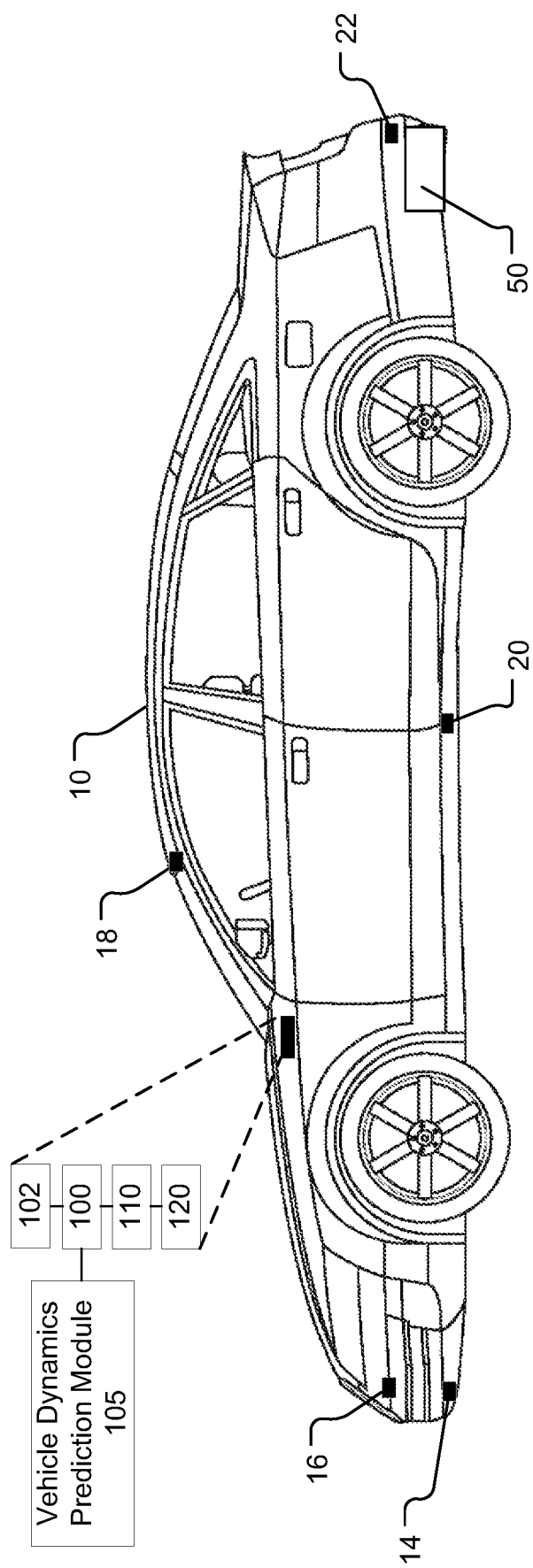
FIG. 5 is a left side view of the vehicle of FIG. 1.
Figure 6:
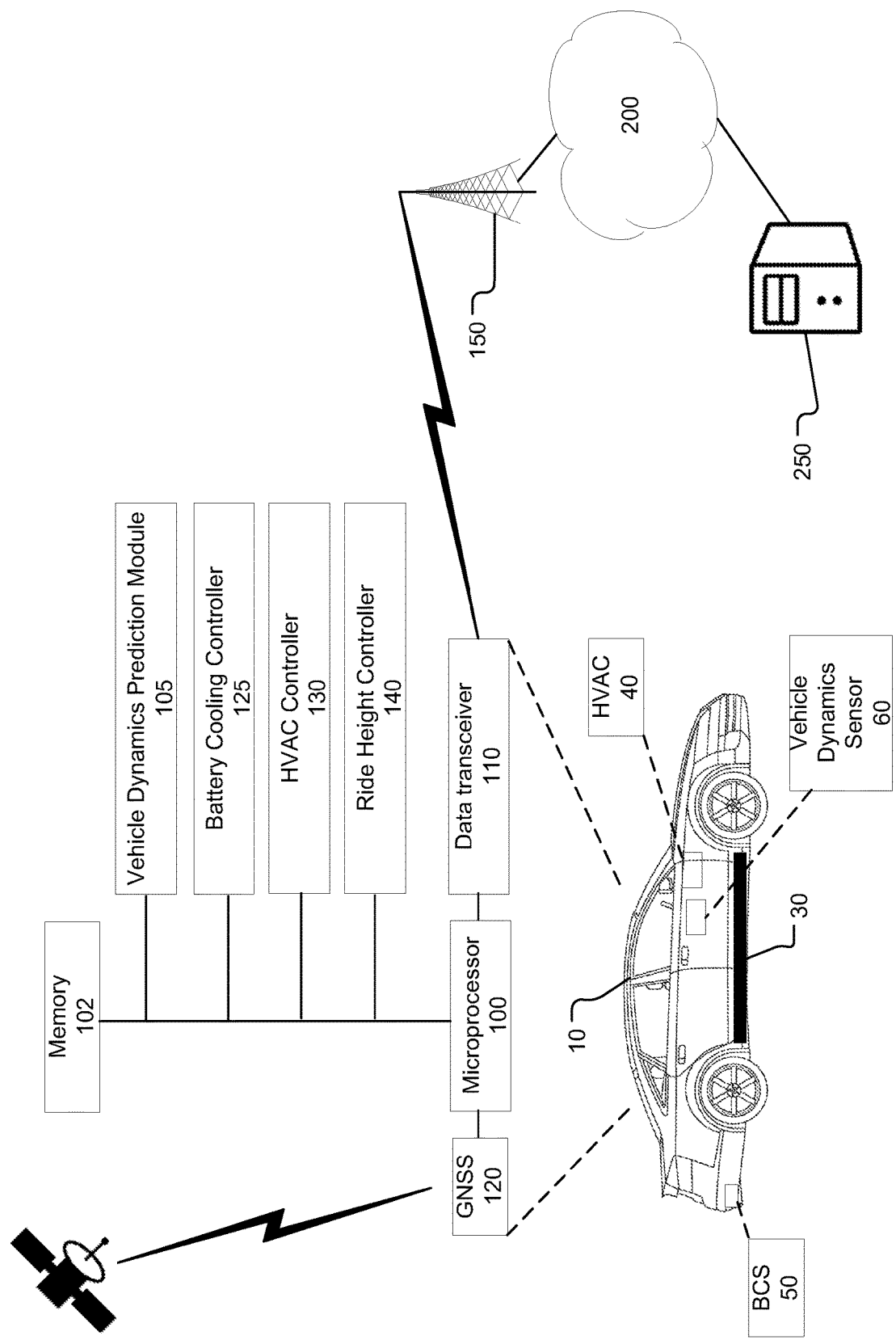
FIG. 6 depicts an autonomous electric vehicle having a vehicle dynamics prediction module, a battery cooling controller, an HVAC controller and a ride height controller in accordance with one embodiment of the present invention.

As depicted in FIGS. 4, 5 and 6, the autonomous vehicle 10 includes a radiofrequency data transceiver 110, e.g. a wireless data transceiver for transmitting and receiving data wirelessly. In one embodiment, the data transceiver 110 is a cellular data transceiver. The data transceiver 110 is configured to wirelessly communicate data from the vehicle to the remote control device by attaching communicatively to a base transceiver station 150 as shown in FIG. 6. Data is transmitted and received over a cellular wireless network using cellular communication protocols and standards for packet data transfer such as GSM, CDMA, GPRS, EDGE, UMTS, LTE, 5G, etc. The vehicle may include a Subscriber Identity Module (SIM) card for GSM-type communications or a Re-Usable Identification Module (RUIM) card for CDMA-type communications. From the base transceiver station 150 the data is communicated via the internet 200 to a server 250 or a plurality of servers as depicted in FIG. 6. The server(s) may provide traffic data, road condition data, weather data, etc.

The autonomous electric vehicle 10 in the embodiment depicted in FIG. 6 further includes a Global Navigation Satellite System (GNSS) receiver 120 for receiving satellite signals and for determining a current location of the self-driving vehicle. The GNSS receiver may be a Global Positioning System (GPS) receiver that decodes satellite signals transmitted by orbiting GNSS satellites. The GNSS (or GPS) receiver may be part of the vehicle navigation system. The GNSS or GPS receiver (e.g. in the form of a chip or chipset) receives GNSS/GPS radio signals transmitted from one or more orbiting GNSS/GPS satellites. References herein to "GPS" are meant to include Assisted GPS and Aided GPS. Although the present disclosure refers expressly to the "Global Positioning System", it should be understood that this term and its abbreviation "GPS" are being used expansively to include any satellite-based navigation-signal broadcast system, and would therefore include other systems used around the world including Beidou (COMPASS), Galileo, GLONASS, IRNSS, and QZSS.

The Society of Automotive Engineers (SAE) has defined multiple levels of autonomous vehicle operation. At levels 0-2, a human driver monitors or controls the majority of the driving tasks, primarily without assistance from the vehicle. For example, at level 0 ("no automation"), a human driver is responsible for all vehicle operations. At level 1 ("driver assistance"), the vehicle occasionally assists with steering, acceleration, or braking, but the driver is still responsible for the vast majority of the vehicle control. At level 2 ("partial automation"), the vehicle controls steering, acceleration, and braking under certain circumstances without human interaction. At levels 3-5, the vehicle assumes more driving-related tasks. At level 3 ("conditional automation"), the vehicle handles steering, acceleration, and braking under certain circumstances as well as monitoring of the driving environment. Level 3 only requires the driver to intervene occasionally. At level 4 ("high automation"), the vehicle handles the same tasks as at level 3 but without relying on the driver to intervene in certain driving modes. At level 5 ("full automation"), the vehicle handle all, or almost all, tasks without any driver intervention.

As depicted by way of example in FIG. 6, the vehicle may have a heating, ventilation and air conditioning (HVAC) system 40 to cool or heat the passenger cabin, i.e. to provide climate control for the cabin. The HVAC system 40 may be connected to the battery 30 to receive electrical power from the battery 30 to power the HVAC system 40. Waste heat from the battery 30 may be used to heat the cabin.

In accordance with one aspect of the present disclosure, the autonomous electric vehicle 10 depicted by way of example in FIGS. 1-6 includes a dual underside battery cooling system (BCS) 50 that cools the battery 30 of the autonomous electric vehicle 10 while also providing aerodynamic ground effects to generate a balanced downforce on the vehicle 10 when accelerating in a straight line or to produce a differential downforce on the vehicle 10 to compensate for centrifugal roll when the vehicle 10 is cornering. In at least some embodiments, the battery 30 is supported by the chassis or otherwise disposed within the body of the vehicle. In some embodiments, the battery is beneath, or least partially beneath, the passenger cabin. The dual underside battery cooling system 50 cools the battery by transferring heat from the battery. In some embodiments, the dual underside battery cooling system 50 includes a left fan 52 for generating a left airflow 53 along a left underside path of the vehicle and a right fan 54 for generating a right airflow 55 along a right underside path of the vehicle, the left and right airflows transferring heat from the battery as the air flows along the underside of the battery or battery compartment. The processor 100 of the vehicle is configured to independently control the left fan 52 and the right fan 54 to selectively generate a differential downforce on left and right wheels of the vehicle when cornering to thereby compensate for centrifugal roll and to generate an equal downforce on the left and right wheels when accelerating in a straight line. For example, the processor 100 may wish to increase traction for rapid acceleration or to increase tire grip in slippery road conditions. Each of the left fan 52 and the right fan 54 includes a plurality of fan blades on a rotor, a shroud encompassing the fan blades, and a DC fan motor for rotating the rotor and fan blades. An electronic speed controller (ESC) is connected electrically to each DC fan motor and receives a control signal from the processor 100. Each ESC generates a drive current for its respective DC motor. The processor thus can send two different signals to the two ESCs to control independently each of the fans.

In the embodiment of FIG. 6, the vehicle 10 includes a vehicle dynamics prediction module 105 to predict a vehicle dynamics condition and to generate control signals to control the left and right fans 52, 54 pre-emptively such that control of the left and right fans begins prior to the vehicle dynamics condition occurring. By pre-emptively controlling the fans, the fans have time to spool up to their target rotational speeds to generate the downforces in time to offset vehicle roll, i.e. to synchronize the downforce with the centrifugal roll encountered when cornering. In one implementation, the processor 100 determines a target downforce based on the predicted centrifugal roll. The processor 100 then accesses from the memory a spool-up time for the fan to reach a target fan speed that is needed to produce the target downforce. The processor then calculates the time to reach the turn where the target downforce is needed to offset the centrifugal roll at the turn. The processor then activates the fan at the requisite time before reaching the turn in order to give the fan exactly the right amount of time to spool up to the target fan speed. The vehicle dynamics prediction module 105 may be executed by the processor 100. For a software implementation, code for the vehicle dynamics prediction module 105 may be stored in the memory 102 as well as other data computed or generated by the vehicle dynamics prediction module 105. The GNSS receiver 120 may be used to determine the current location of the vehicle in real-time for determining the current route or roadway. When operating in autonomous driving mode, the vehicle knows the turns it will make and thus the vehicle dynamics prediction module 105 can predict what turns or corners the vehicle will be encountering and at what speed. Even if operating in manual driving mode or semi-autonomous driving mode, the vehicle dynamics prediction module 105 may still be able to predict cornering forces, for example if the road curves, and based on the current speed and/or speed limit.

The vehicle dynamics prediction module 105 may obtain road condition data, traffic data, weather data or any other useful data using the data transceiver 110 for the upcoming portion of the route over which the vehicle is traveling.

Based upon the predicted route and speed, and optionally also based on traffic, weather or other road conditions, the vehicle dynamics prediction module 105 can predict the speed the vehicle will be traveling when cornering or turning, and thus predict the cornering forces on the vehicle pre-emptively so that the fans can be activated prior to the vehicle being subject to the centrifugal roll due to the cornering or turn. Optionally, the vehicle dynamics prediction module 105 may obtain driving data from another vehicle, e.g. another vehicle traveling ahead on the same roadway. The vehicles may communicate using any suitable vehicle-to-vehicle (V2V) communication protocol or via a commonly accessible server.

Alternatively, or additionally, as shown in FIG. 6, the vehicle may include a vehicle dynamics sensor 60 to sense a vehicle dynamic condition and to generate control signals to control the left and right fans 52, 54 in response to the vehicle dynamics sensor sensing the vehicle dynamics condition. In another implementation, the processor 100 receives signals from the vehicle dynamics sensor 60 and then generates the control signals to control the left and right fans 52, 54. The vehicle dynamics sensor 60 may be a single sensor or a plurality of sensors. The vehicle dynamics sensor 60 may be, or may include, one or more accelerometers, force transducers, inertial measurement units, or any transducer or sensor capable of measuring one or more of acceleration, force, pitch, roll and yaw of the vehicle in order to determine the centrifugal roll when cornering or turning.

From the foregoing, it is understood that the vehicle 10, which may be an electric autonomous vehicle includes one or more processors 100 for independently controlling the left fan 52 and the right fan 54 to selectively generate a differential downforce on left and right wheels 13 of the vehicle 10 when cornering to thereby compensate for centrifugal roll and to generate an equal downforce on the left and right wheels 13 when accelerating in a straight line. In one embodiment, the electric vehicle comprises a vehicle dynamics prediction module 105 to predict a vehicle dynamics condition and to generate control signals to control the left and right fans 52, 54 pre-emptively such that control of the left and right fans 52, 54 begins prior to the vehicle dynamics condition occurring. In another embodiment, the electric vehicle 10 comprises a vehicle dynamics sensor 60 to sense a vehicle dynamic condition and to generate control signals to control the left and right fans 52, 54 in response to the vehicle dynamics sensor 60 sensing the vehicle dynamics condition. The vehicle sensor 60 may be an accelerometer capable of detecting linear acceleration in a forward direction, deceleration due to braking, roll, yaw or pitch. The vehicle sensor 60 may include a plurality of accelerometers for detecting linear acceleration, linear deceleration as well as roll, yaw and pitch.

In the embodiment depicted in FIG. 6, the vehicle 10 includes a battery cooling controller 125 that measures the temperature of the battery 30 and controls the cooling of the battery. The battery cooling controller 125 may be part of a battery management system (BMS) of the electric vehicle. The battery cooling controller 125 is communicatively connected with the battery cooling system 50 to control the fans 52, 54 to cool the battery 30.

In the embodiment depicted in FIG. 6, the vehicle 10 includes an HVAC controller 130 that is communicatively connected with the HVAC system 40 for controlling the HVAC system 40. The HVAC controller 130 may deactivate the fans 52, 54 or reduce the fan speed of one or both of the fans 52, 54 when the HVAC system 40 of the vehicle calls for heat to be delivered to the cabin. In one embodiment, the HVAC controller 130 communicates with the battery cooling controller 125 to determine how much cooling or heating to provide to the passenger cabin and how much cooling is to be provided to the battery 30. The processor 100 may act as a master controller, receiving signals from both the HVAC controller 130 and the battery cooling controller 125 to determine how much cooling to heating to allocate to the battery and to the passenger cabin. The processor 100 may also use an HVAC signal from the HVAC controller 130 and a battery cooling signal from the battery cooling controller 125 in conjunction with a predicted vehicle dynamics condition from the vehicle dynamics prediction 105 to control the fans 52, 54 of the battery cooling system 50. The processor 100 may thus control the activation and deactivation of the fans 52, 54 and/or their respective fans speeds based on signals from the HVAC controller 130.

The vehicle may include a ride height controller 140 to increase or decrease the ride height to increase or decrease the ground effect of underside airflow generated by the fans 52, 54. To increase ground-effect downforce, the ride height controller lowers the ride height of the vehicle. The lower the vehicle is to the ground, the greater the ground effect of the fans 52, 54 for a given fan speed or fan speeds. However, the ride height controller 140 may be configured to only lower the ride height when a road sensor of the vehicle senses that the road ahead is suitable to a lower ride height. For example, if the road sensor detects that the road ahead is smooth and flat, e.g. free of bumps, ruts, potholes, obstacles, debris, etc. then the ride height controller 140 may lower the vehicle. The processor 100 may act as a master controller to signal to the ride height controller 140 that greater downforce is required or desirable. In response to the signal, the ride height controller 140 may determine if the ride height may be safely lowered using the road sensor. If the ride height may be safely lowered, the ride height controller 140 lowers the ride height. Lowering the ride height may be accomplished by adjusting the suspension of the vehicle using hydraulic or pneumatic actuators, for example. Adjustment of ride height by ride height controller may be implemented in various ways, such as for example, using or adapting the technologies disclosed in U.S. Pat.

Nos. 9,457,812, 9,643,466, 10,052,928, and 10,160,279, which are incorporated herein by reference.

Figure 7:
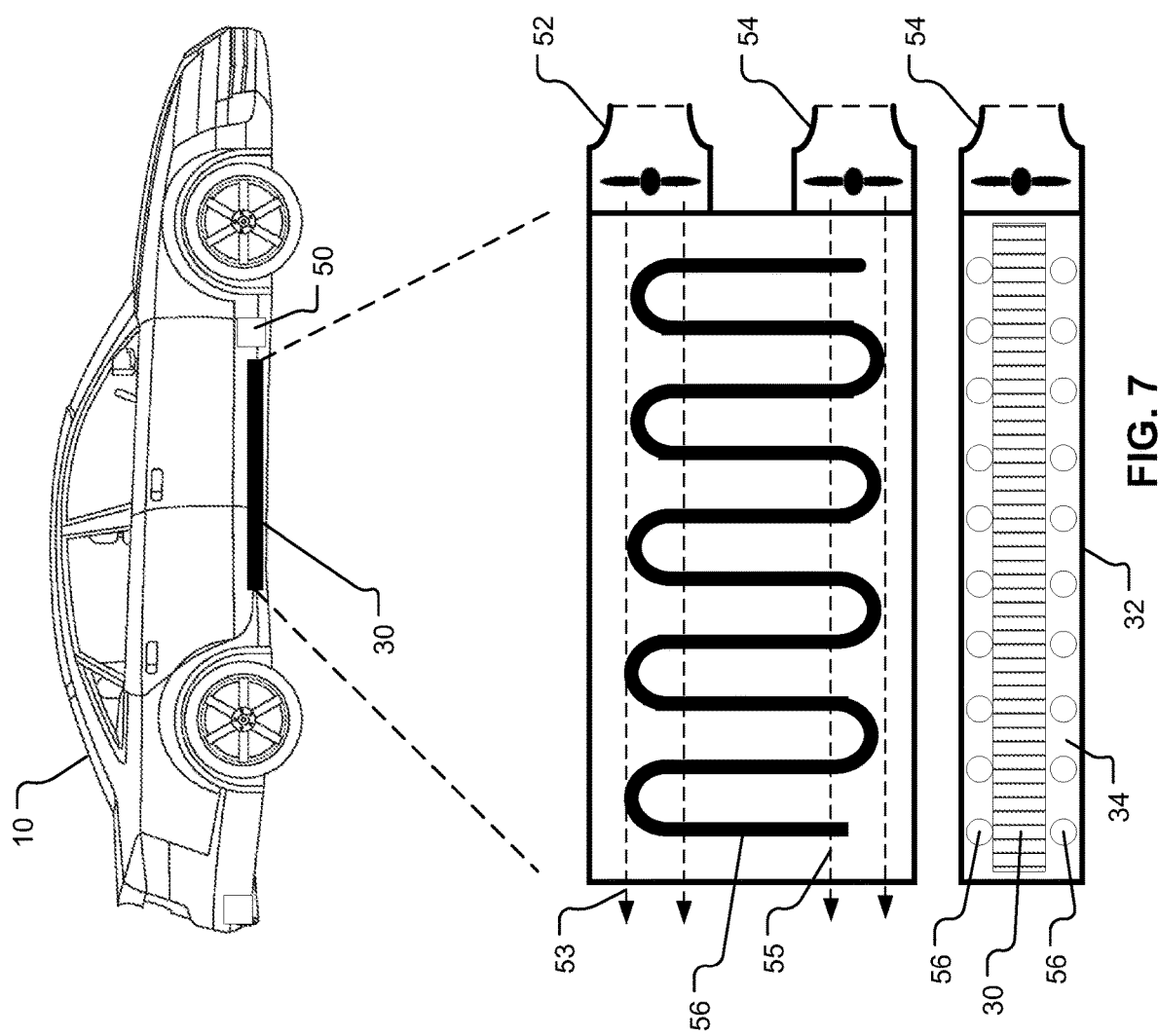
FIG. 7 depicts an autonomous electric vehicle showing an enlarged schematic view of the battery compartment, the battery, a heat exchanger coil for cooling the battery and the dual fans of the dual underside fan system.

In at least some of the embodiments of the present invention, as depicted in FIG. 7, the electric vehicle 10 has a battery 30 in a battery compartment 32 supported on or by the chassis 13 or integrated with the chassis or otherwise disposed within the body 11 of the vehicle. The battery or battery pack may be disposed along a lower portion or bottom portion of the chassis, i.e. beneath the passenger cabin, so as to lower the center of gravity of the vehicle. The battery compartment 32 contains the battery 30 and a space or volume 34 through which air may flow or circulate in some embodiments. The battery and battery compartment may have a battery cooling system similar to the one disclosed for example in U.S. Pat. No. 10,256,514 which is incorporated herein by reference. The battery cooling system may also be similar to one of those disclosed in U.S. Pat. Nos. 11,108,101, 10,263,301, 9,564,664, 9,067,486, and 9,742,043, which are also incorporated herein by reference.

In the embodiment illustrated by way of example in FIG. 7, the electric vehicle 10 has a dual underside battery cooling system 50 to transfer heat away from the battery to thereby cool the battery to prevent overheating of the battery and/or to improve its performance by maintaining a temperature of the battery within an appropriate operating temperature range. The dual underside battery cooling system 50 includes a left fan 52 for generating a left airflow 53 along a left underside path of the vehicle and a right fan 54 for generating a right airflow 55 along a right underside path of the vehicle. The left and right airflows 53, 55 transfer heat convectively from the battery 30 and/or battery compartment 32.

As further illustrated by way of example in FIG. 7, the battery cooling system 50 may include a heat exchanging coil 56. U.S. Pat. No. 10,476,051, which is incorporated herein by reference, depicts an integrated battery pack heat exchanger system for an electric vehicle. As depicted by way of example in FIG. 7, the heat exchanging coil 56 may be disposed above and below the battery 30 as shown, or it may be disposed only above or only below the battery 30 or it may be inserted inside the batter by wending between cells of the battery. Alternatively, the heat exchanging coil 56 may be disposed outside the battery compartment 32, e.g. disposed against the walls of the battery compartment. Regardless of the design and location of the heat exchanging coil 56 relative to the battery, the purpose of the heat exchanging coil is to transfer heat from the battery to the coolant circulating within the heat exchanging coil 56. The heat in the coolant is then cooled by the airflows generated by fans 52, 54 by convectively removing heat from the coolant as it interacts thermally with the airflows underneath the vehicle. It will be appreciated that other types of heat exchangers may be used to cool the battery in other embodiments. Regardless of the type of heat exchanger, the airflows underneath the vehicle in these other embodiments also serve to transfer heat from the heat exchanger. The speed of the air flowing in the airstreams (airflows) under the vehicle is controlled by the battery cooling system which regulates the speed of the fans 52, 54 to increase or decrease battery cooling while also providing downforce on the vehicle. The underside of the vehicle may include diffusers, e.g. left and right diffusers, to create downforce (downward suction) on the vehicle.

Figure 8:
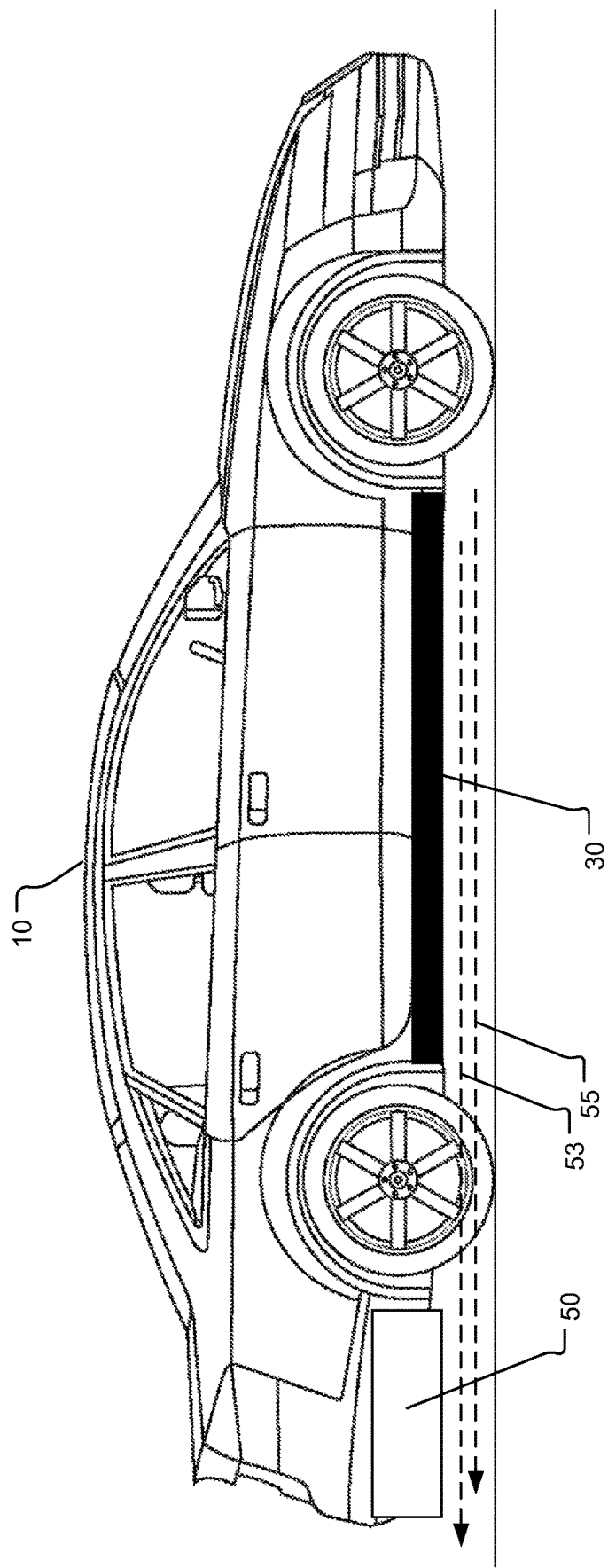
FIG. 8 depicts an autonomous electric vehicle in which the dual underside fan system convectively cools the underside of the battery by conveying air beneath the battery.

FIG. 8 illustrates two airflows 53, 55 generated by two respective fans of the battery cooling system 50 of the vehicle 10. In this embodiment, the two airflows travel along the underside of the battery 30 to convectively cool the battery. The underside of the vehicle may include a flow divider defining two channels to keep the airflows separate or least partially separate. It will be appreciated that some degree of commingling of the airflows will occur as the airflows are side-by-side and are not therefore not completely separate and discrete.

Figure 9:
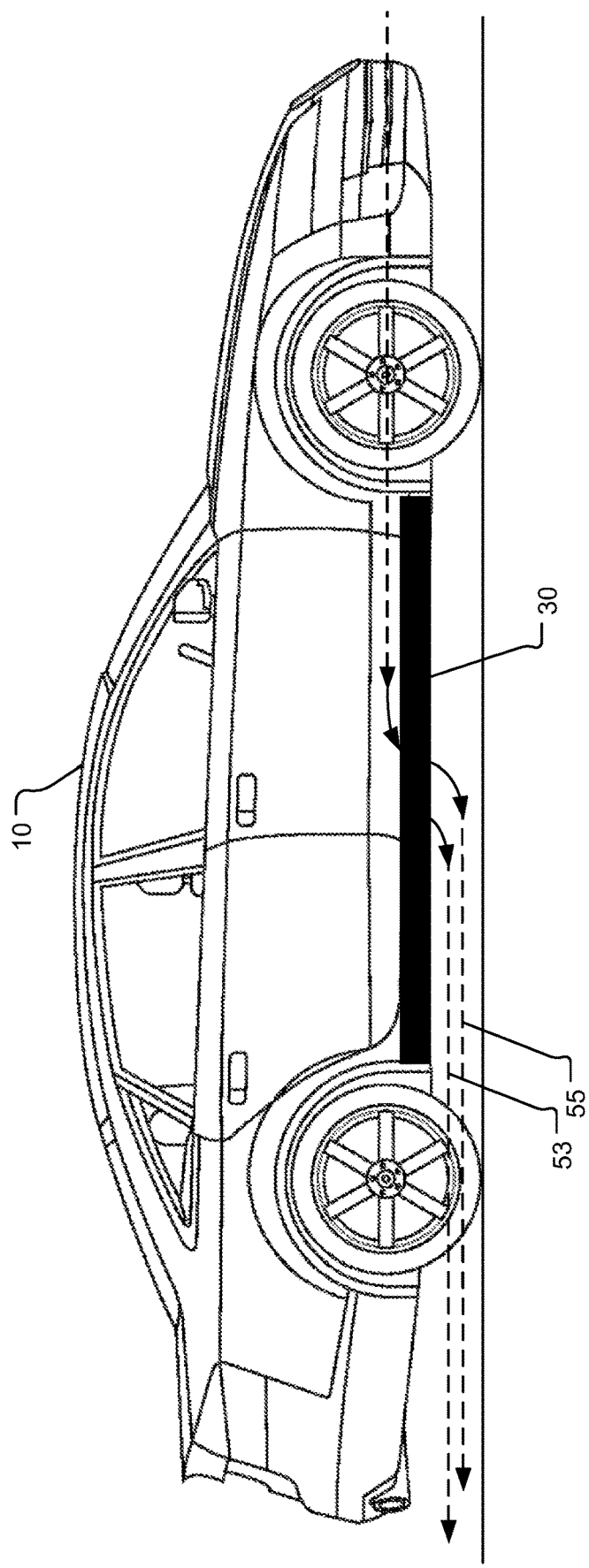
FIG. 9 depicts an autonomous electric vehicle in which the dual underside fan system draws hot air from the battery compartment into air streams below the vehicle.

FIG. 9 illustrates another embodiment in which the airflows 53, 55 flow through the battery compartment to cool the battery. In this embodiment, the battery compartment has forward air inlets and rearward air outlets to enable air to flow into the battery compartment and then out of the battery compartment, thereby drawing hot air from the battery compartment out of the battery compartment to thus cool the battery. The forward air inlets and rearward air outlets may optionally have ports that are opened and closed by actuators to selectively open and close the forward air inlets and the rearward air outlets.

Figure 10:
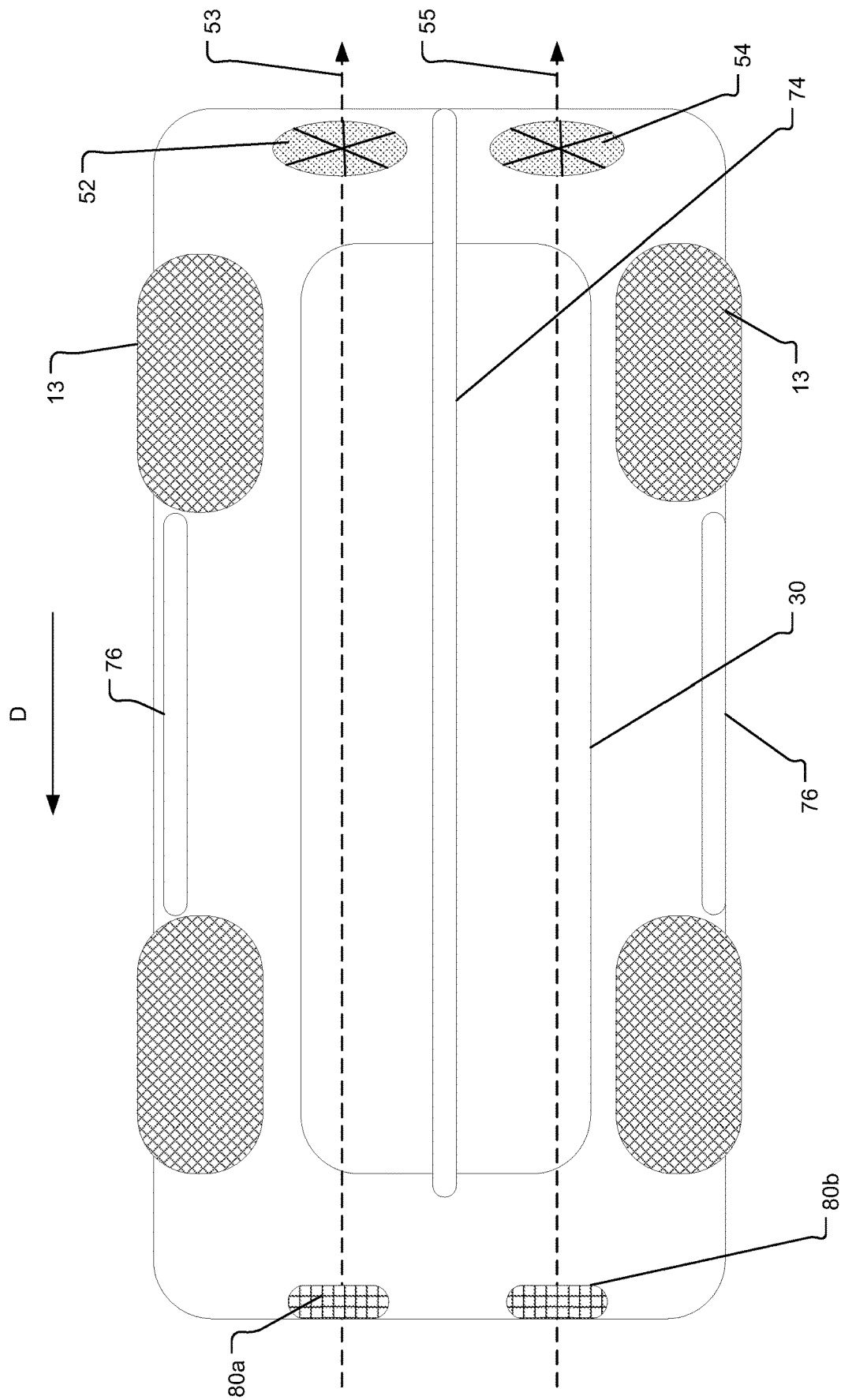
FIG. 10 is a bottom view of a vehicle schematically depicting a dual underside fan system in which the dual fans are located at the rear of the vehicle.

FIG. 10 illustrates the underside of an electric vehicle 10 having left and right fans 52, 54 disposed at the rear of the vehicle in accordance with one embodiment. The direction of travel or drive direction is denoted by the arrow D. Specifically, the fans 52, 54 in this illustrated embodiment are disposed rearwardly of the battery 30. The fans 52, 54 draw air from under the vehicle and expel the air rearwardly. In this embodiment, the vehicle 10 has a central divider 74 (acting as an airstream fence) to divide the left and right airflows 53, 55 to thereby define the left and right underside paths. The underside may have a deployable central divider, central curtain or other centrally aligned longitudinal element that is deployed downwardly to define the left and right paths. Optionally, as further illustrated in FIG. 10, two deployable side skirts 76 or side curtains may be provided to define channels for the left and right airflows 53, 55. Specifically, in one particular embodiment, a left channel is defined between a left side skirt and the central divider whereas a right channel is defined between a right side skirt and the central divider.

In some embodiments, as further depicted by way of example in FIG. 10, the electric vehicle 10 has air intakes 80, e.g. front air intakes in a forward portion of the body of the vehicle, that provide a flow of air to the battery compartment. In these embodiments, the processor may be configured to control the air intakes 80. For example, in one embodiment, which is depicted in FIG. 10, the vehicle 10 has a left front intake 80a and a right front intake 80b disposed in the forward portion of the body of the vehicle 10. In this embodiment, the processor 100 may be configured to control the left and right front air intakes 80a, 80b disposed in the forward portion of the body of the vehicle 10. The processor 100 thus may be configured to open the left front air intake 80a when the left fan 52 is activated and/or to open the right front air intake 80b when the right fan 54 is activated. Likewise, the processor 100 may be configured to close the left front air intake 80a and/or the right front air intake 80b when the left and/or right fans 52, 54 are deactivated.

Figure 11:
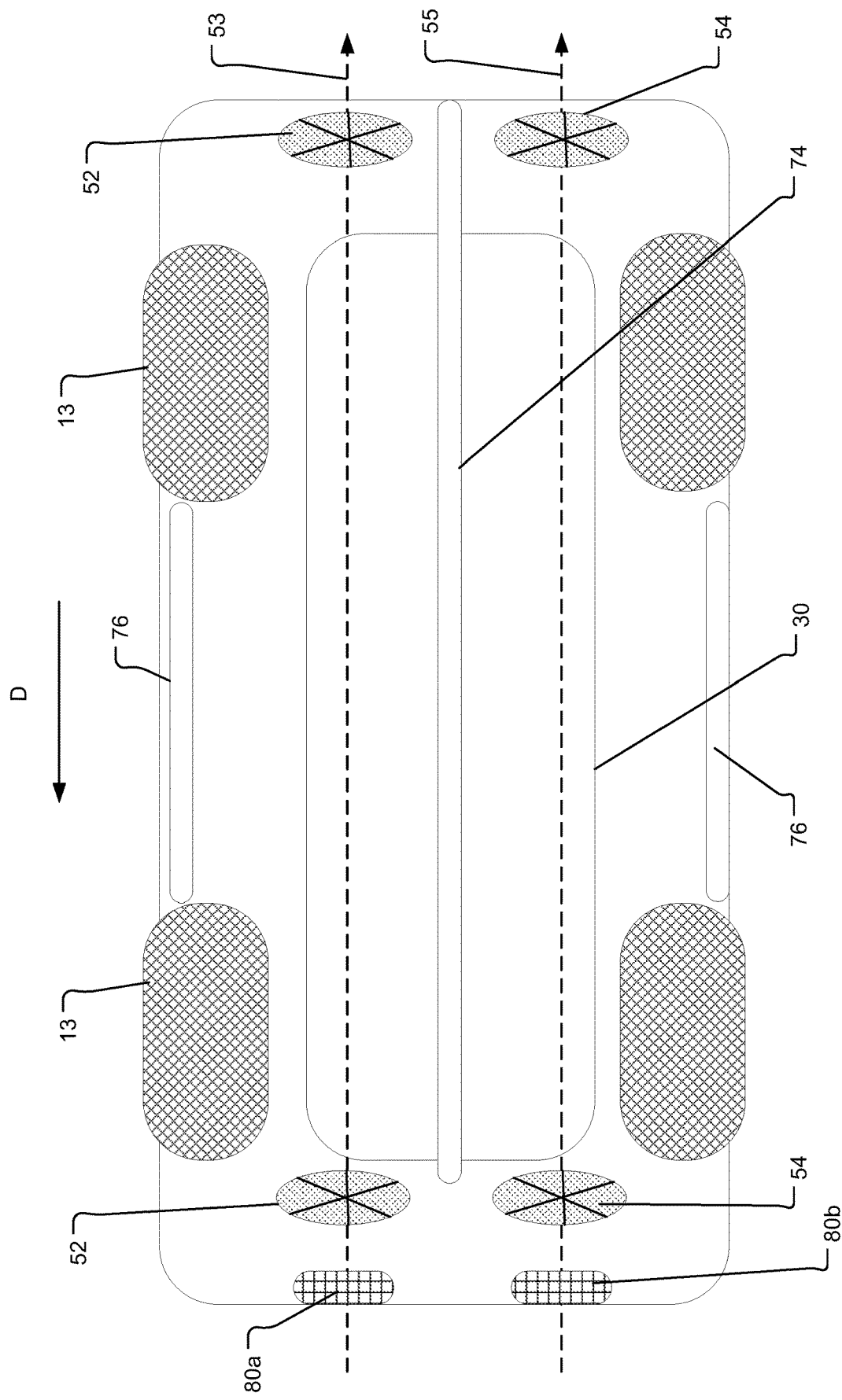
FIG. 11 is a bottom view of a vehicle schematically depicting a dual underside fan system in which two fans are located at the rear of the vehicle and two additional fans are located at the front of the vehicle.

The dual underside fan system 50 may have a pair of fans at the front of the vehicle and also a pair of fans at the rear of the vehicle. FIG. 11 is a bottom view of a vehicle 10 schematically depicting a dual underside fan system 50 in which two fans 52, 54 are located at the rear of the vehicle 10 and two additional fans 52, 54 are located at the front of the vehicle 10. In this example, the two left fans 52 may be controlled together by the processor and the two right fans 54 may be controlled together by the processor. In other words, in one embodiment, the left fans 52 may be activated/ deactivated in unison to provide the left airflow whereas the right fans 54 may be activated/deactivated in unison to provide the right airflow. To that end, the processor is configured to concurrently send an identical signal to both left fans to activate, deactivate or adjust fan speed. Analogously, the processor is configured to concurrently send an identical signal to both right fans to activate, deactivate or adjust fan speed. In a variant, the fan speed of the front left fan may be set to be different than the fan speed of the rear left fan. Analogously, in a variant, the fan speed of the front right fan may be set to be different than the fan speed of the rear right fan.

Figure 12:
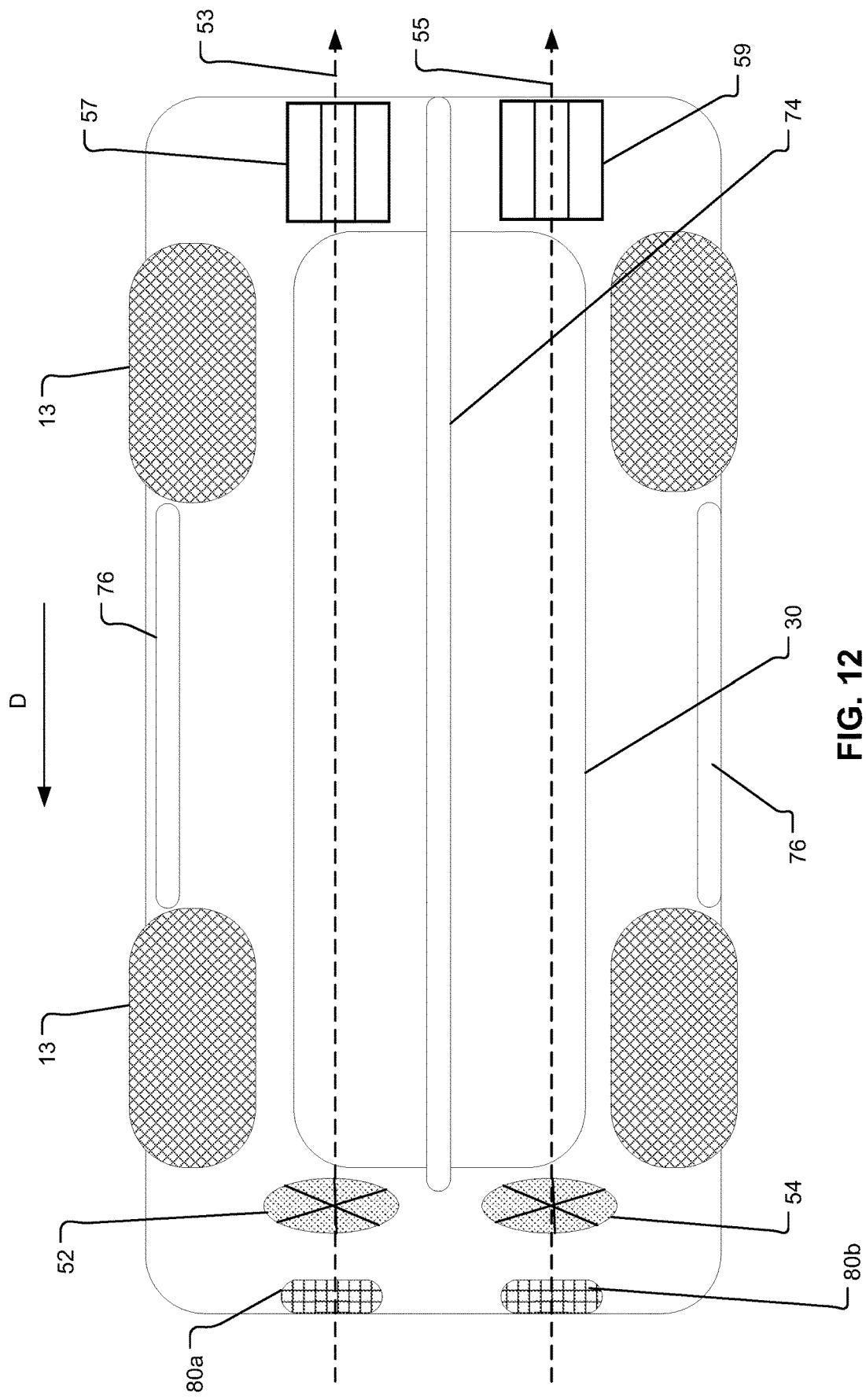
FIG. 12 is a bottom view of a vehicle schematically depicting a dual underside fan system in which the dual fans are located at the front of the vehicle.

FIG. 12 is a bottom view of a vehicle 10 schematically depicting a dual underside fan system 50 in which the dual fans 52, 54 are located only at the front of the vehicle 10 (i.e. no fans are located at the rear of the vehicle). As further depicted in FIG. 12, the vehicle may have two spaced-apart diffusers to enhance ground-effect downforce. The diffusers may be located at the rear of the vehicle, i.e. rearward of the battery. As depicted in the embodiment of FIG. 12, the vehicle has a left diffuser 57 and a right diffuser 59. The left airflow 53 is aligned with the left diffuser 57. The right airflow 55 is aligned with the right diffuser 59. Note that the diffusers may generate downforce even when the fans 52, 54 are off, provided the vehicle is moving at a sufficient speed to aerodynamically produce the downforce due to the diffuser effect. Downforce is augmented or amplified by forcing air to travel at a greater speed than the vehicle speed under the vehicle, i.e. when the airspeed under the vehicle is greater than the vehicle speed. Optionally, the left diffuser 57 and the right diffuser 59 are variable-angle diffusers in which the angle that each of the diffusers defines with a horizontal plane is variable by adjusting an angled diffuser panel of the diffuser. Adjusting the angle of the angled diffuser panel alters the downforce that each diffuser generates. The variable-angle diffusers may be independently adjustable by independently varying the angles of each of the two angled diffuser panels. As such, a differential downforce may be generated when the diffuser panels are asymmetrically angled. Optionally, the vehicle may include front downforce-generating surfaces (e.g. splitters, air dams, airfoils, or any combination thereof) that generate a front downforce to balance the diffuser-generated downforce to maintain the pitch of the vehicle when the diffusers are actively generating downforce. Optionally, the front downforce-generating surfaces are variable or movable surface that can be controlled to vary the amount of front downforce. Optionally, the processor 100 coordinates and balances the amount of rear downforce due to the airflow through the diffusers due to the dual fans 52, 54 with the amount of front downforce generated by the front downforce-generating surface(s), e.g. by automatically adjusting one or more splitters, air dams and/or airfoils to balance the pitch of the vehicle. Furthermore, the processor 100 may adjust the downforce generated by the front downforce-generating surface(s) to account for acceleration and braking so as to maintain a zero pitch of the vehicle during acceleration and braking or to maintain pitch rate changes within a predetermined range to minimize pitching of vehicle during braking and acceleration. Moreover, in another implementation, the front downforce-generating surfaces may be independently controlled so that the left and right front downforce-generating surfaces generate differential downforce. This may be coordinated with a differential rear downforce generated by controlling the fans 52, 54 and optionally the diffuser panel angles to produce a differential rear downforce. Together, the differential front downforce (differential between left front wheel and right front wheel) and differential rear downforce (differential between left rear wheel and right rear wheel) may be used to counteract centrifugal roll when cornering. The differential front downforce and the differential rear downforce may be equal (i.e. the same difference exist at the front and at the rear between the respective left and right wheels), or the differential downforce at the front may be greater or less than the differential downforce at the rear. In the latter case, the downforce on each of the four wheels is different from the downforces acting on the other wheels. In other words, each wheel has a different amount of downforce, enabling the processor to balance the vehicle in terms of roll and pitch.

Figure 13:
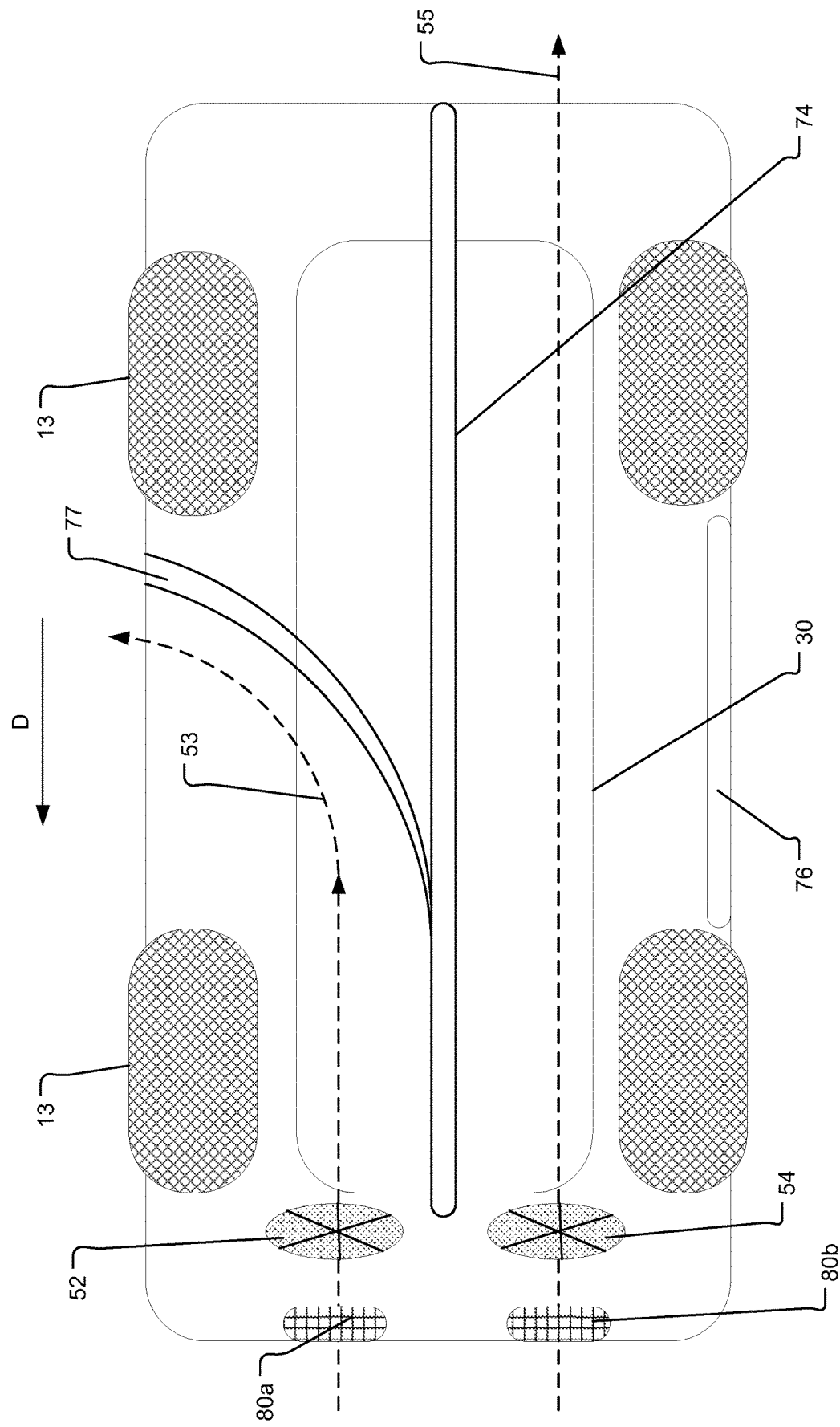
FIG. 13 schematically depicts a variant of the dual underside fan system of FIG. 12 in which a lateral diverter is provided to selectively divert airflow to one side of the vehicle.

FIG. 13 schematically depicts a variant of the dual underside fan system of FIG. 12 in which a lateral diverter 77 is provided to selectively divert airflow to one side of the vehicle. In this embodiment, the lateral diverter 77 (which may be straight or curved as shown) is movable from a centerline to an air-diverting position to selectively divert one of the airflows to one side of the vehicle or the other. The lateral diverter 77 may be used to assist in cornering by diverting airflow to one side. In the illustrated example, the lateral diverter 77 diverts the left airflow 53 to the left side of the vehicle.

Figure 14:
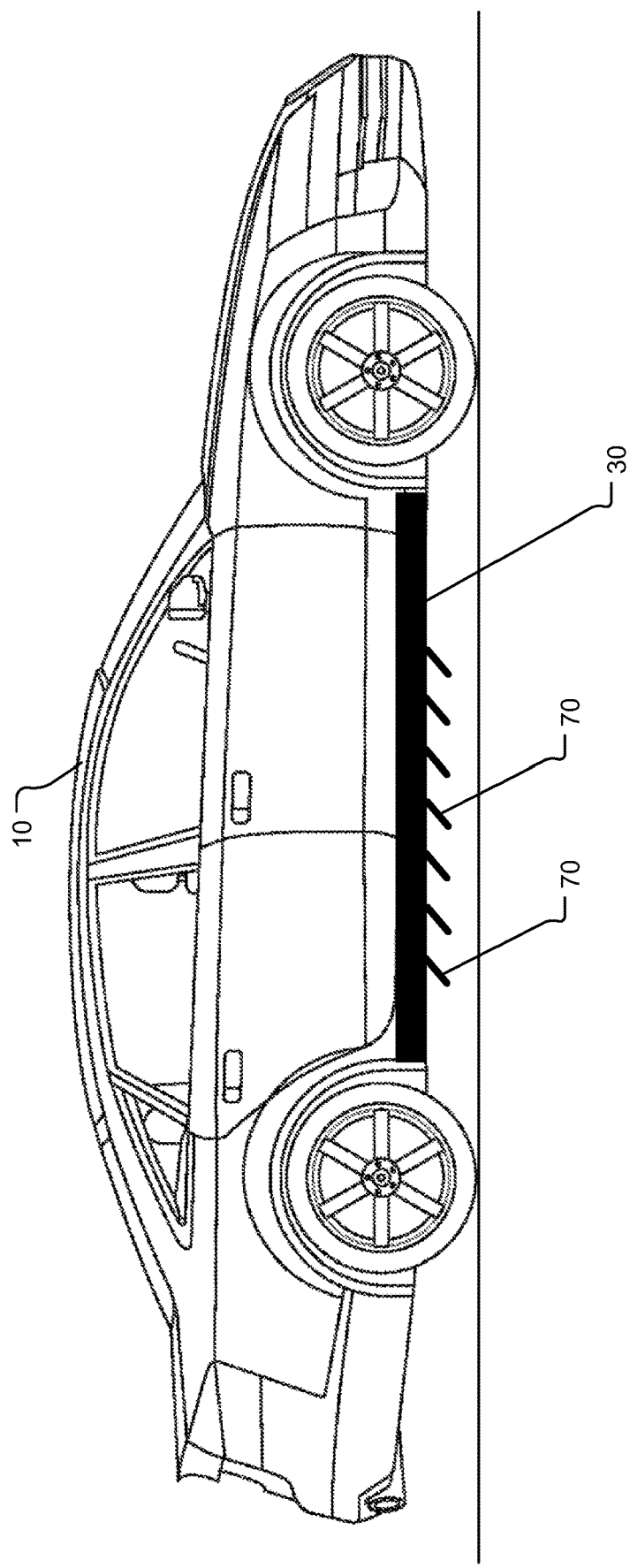
FIG. 14 depicts a vehicle in which the dual underside fan system also includes movable louvers to vent hot air from the battery compartment.
Figure 15:
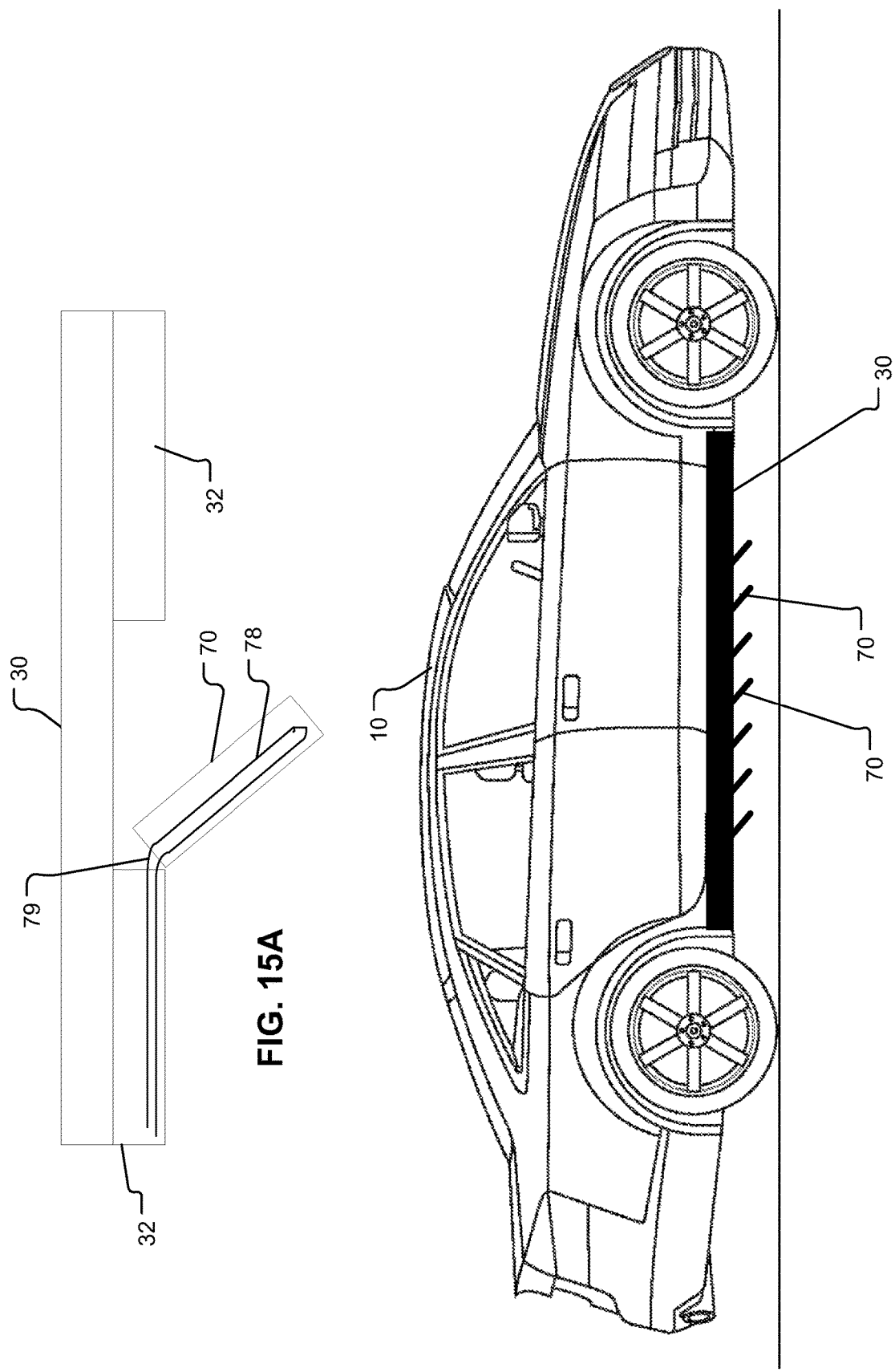
FIG. 15 depicts a variant of the vehicle of FIG. 14 in which the movable louvers open forwardly.

As depicted in FIG. 14, in some embodiments, the electric vehicle 10 comprises a plurality of movable louvers 70 disposed along the underside of the battery 30 or battery compartment, the movable louvers 70 being movable between a closed position and an open position in which air may be vented from a space surrounding the battery. In one implementation, the movable louvers 70 open rearwardly as shown specifically in FIG. 14. In another implementation, the movable louvers 70 open forwardly to create aerodynamic drag when braking as shown specifically in FIG. 15. In one specific implementation, the movable louvers open only if the electric vehicle detects that a road ahead is dry and clean. As depicted in FIG. 15A, the movable louvers 70 may optionally comprise heat-exchanger coils 78 through which a coolant flows. The heat exchanger coils 78 in the louvers may be fluidly connected with the heat exchanger coils in the battery compartment 32. The heat exchanger coils 78 may include flexible tubing sections 79 to permit pivoting of the louvers.

Figure 16:
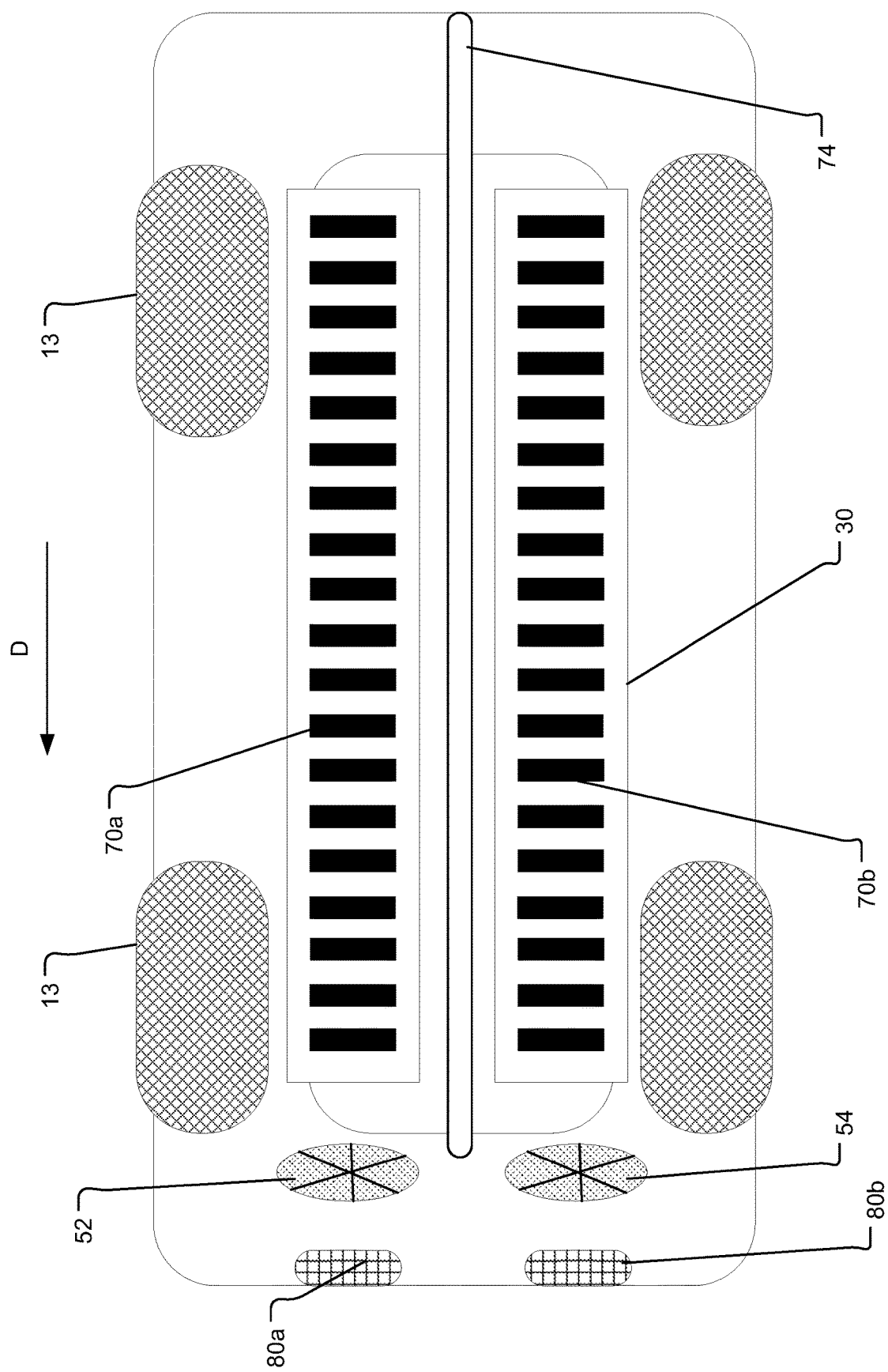
FIG. 16 is a bottom view of a vehicle having movable louvers.
Figure 17:
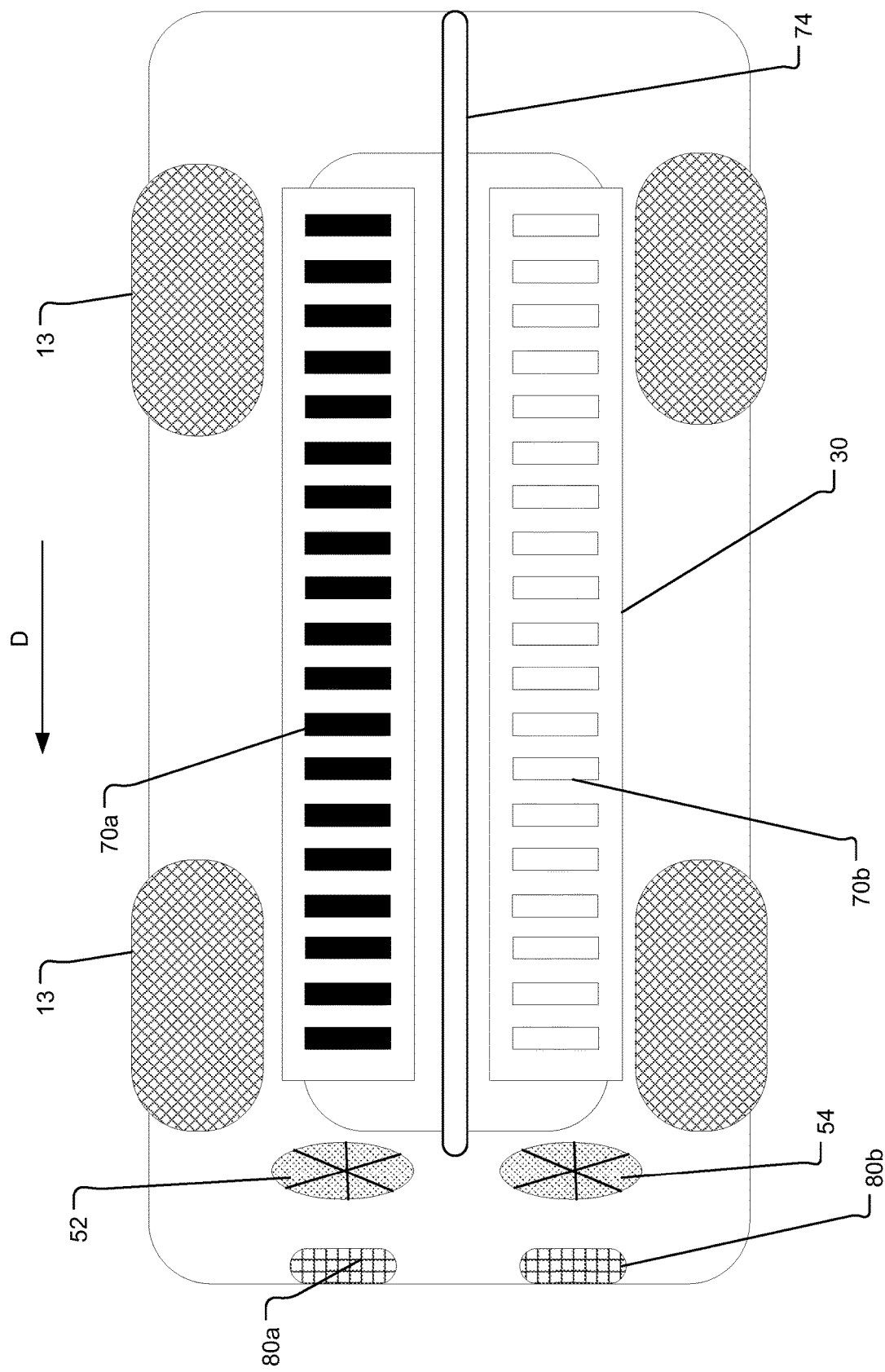
FIG. 17 is a bottom view of the vehicle in which the left-side louvers are closed and the right-side louvers are open.
Figure 18:
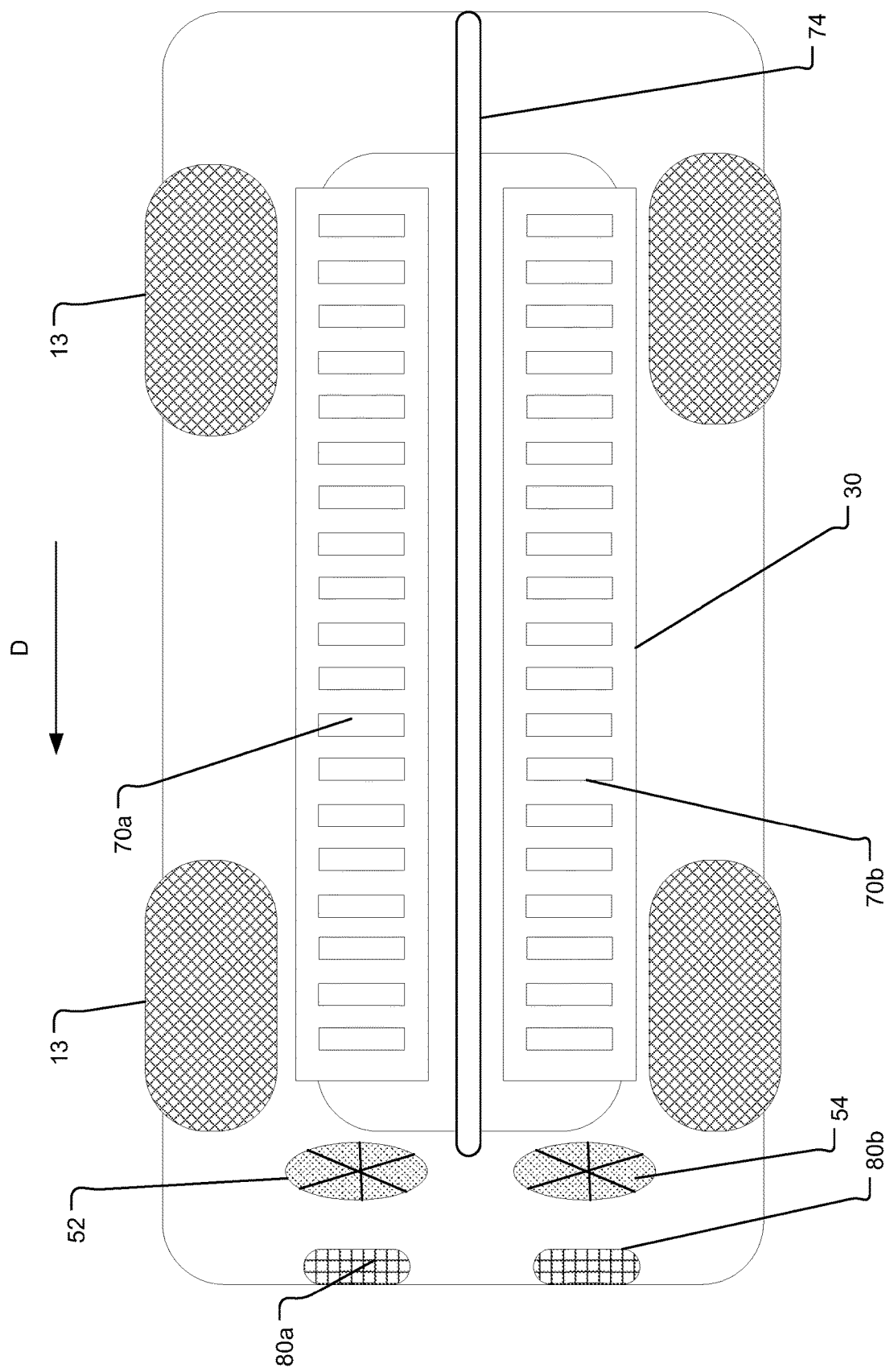
FIG. 18 is a bottom view of the vehicle in which both the left-side and right-side louvers are open.

FIG. 16 is a bottom view of a vehicle 10 having movable louvers. Specifically, the battery compartment may include the louvers along a bottom surface of the battery compartment. As shown by way of example in this figure, the louvers may be rectangular slats or flaps that open and close to function as vents. The louvers may be arranged with their short sides parallel to the drive direction D and their long sides perpendicular to the drive direction D as shown. A plurality of equally sized, equally shaped and equally spaced louvers may be provided as shown in this figure although the size, shape, number and spacing may be varied as will be appreciated. The louvers may pivot between a closed position and an open position. The louvers may pivot in unison. When open, the angle of the louvers may all be the same so that the louvers are all parallel or, alternatively, the angle of each successive louver may be different. In one embodiment, the movable louvers include left-side louvers 70a and right-side louvers 70b. In other words, the electric vehicle 10 may include a plurality of left movable louvers 70a disposed along the left underside of the battery and a plurality of right movable louvers 70b disposed along the right underside of the battery. The left movable louvers 70a may be independently movable of the right movable louvers 70b. Optionally, the left and right movable louvers 70a, 70b are independently deployed to generate a drag-induced yaw effect when braking and cornering. For example, if the vehicle 10 is braking and turning to the left, the left movable louvers 70*a* may be deployed with the right movable louvers 70*b* are closed. This asymmetrical deployment of the left louvers 70*a* causes a left yawing aerodynamic effect on the vehicle 10. Likewise, an asymmetrical deployment of the right louvers 70*b* causes a right yawing aerodynamic effect on the vehicle 10. In FIG. 16, all of the louvers are shown as being closed, i.e. flush with the underside of the vehicle. FIG. 17 is a bottom view of the vehicle 10 in which the left-side louvers 70*a* are closed and the right-side louvers 70*b* are open. FIG. 18 is a bottom view of the vehicle in which both the left-side louvers 70*a* and the right-side louvers 70*b* are open.

Figure 19:
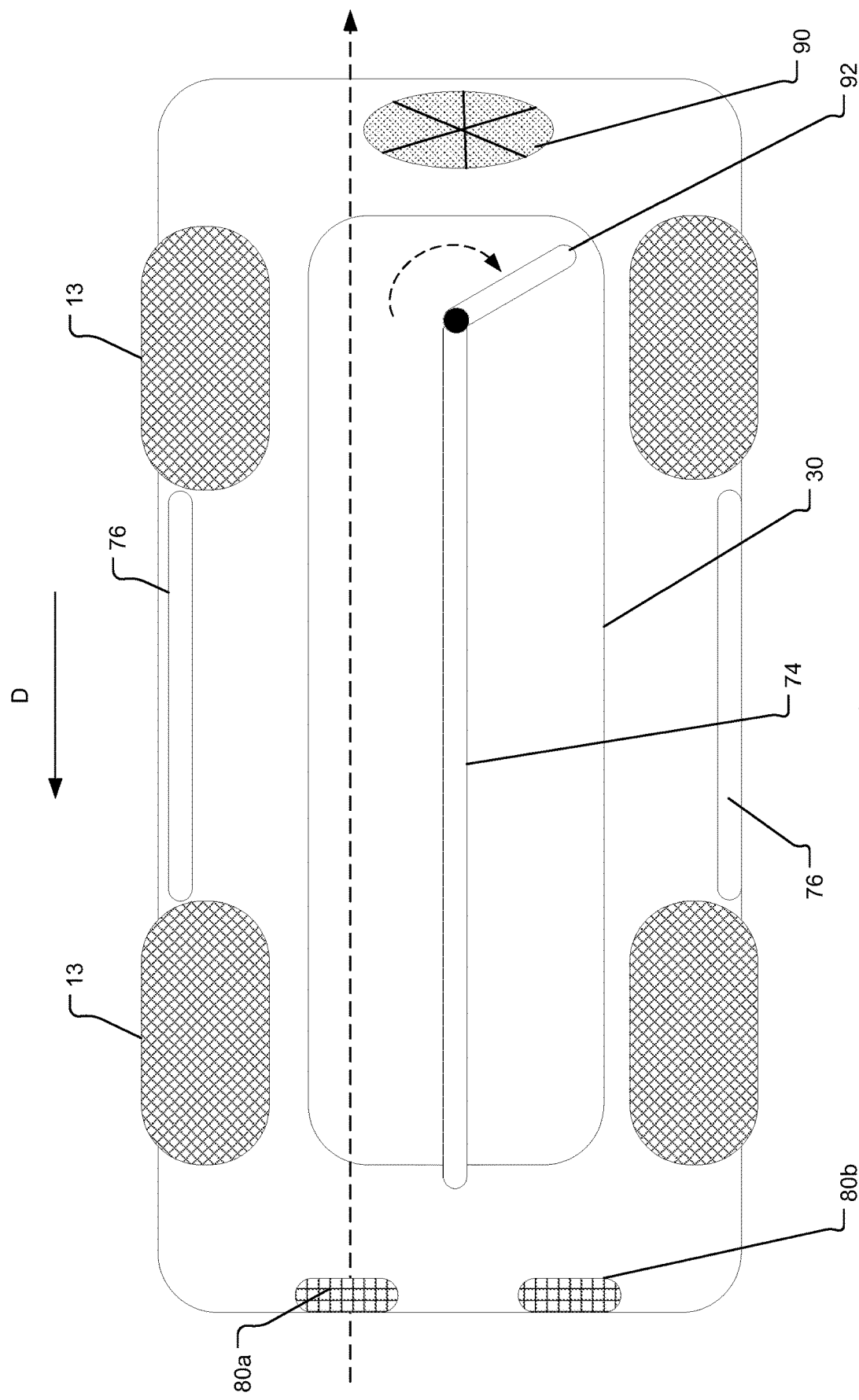
FIG. 19 is a bottom view of a vehicle having only a single fan and an airflow diverter.

FIG. 19 is a bottom view of a vehicle 10 having only a single fan 90 and an airflow diverter 92. The airflow diverter 92 is movable to deflect the airflow from the fan 90 such that there is either a left airflow or a right airflow. Alternatively, the single fan 90 may be a swiveling or directionally adjustable fan to provide a directional airflow.

Figure 20:
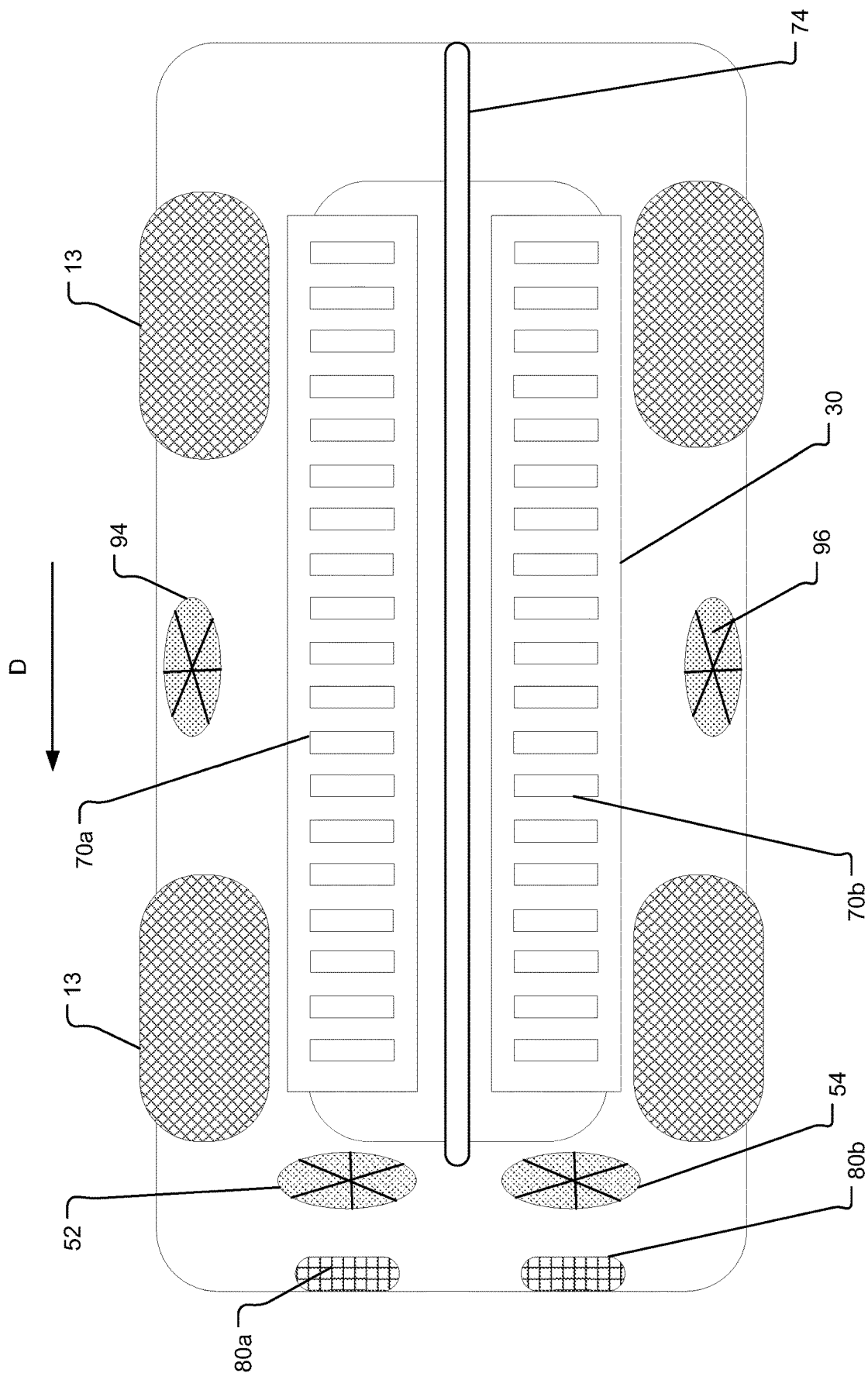
FIG. 20 is a bottom view of a vehicle having two front fans and two side fans.

FIG. 20 is a bottom view of a vehicle having two front fans 52, 54 and two side fans 94, 96, specifically a left side fan 94 and a right side fan 96. The side fans 94, 96 are orthogonal to the front fans 52, 54. The side fans extract air from underneath the vehicle to augment ground effect downforce while also providing battery cooling. The side fans may also be used to provide a lateral thrust. The side fans may be activated individually or synchronously based on a side fan signal or multiple such signals from the processor 100. The side fans may be operated together to evacuate air laterally outwardly from under the vehicle. In that mode, the side fans draw air in opposite directions from beneath the vehicle. However, in another mode of operation, the side fans move air in the same direction such that one fan draws air from under the vehicle while the other pushes air under the vehicle in the same direction, thereby generating a lateral aerodynamic thrust.

To summarize some aspects disclosed above, the electric vehicle 10 in some embodiments comprises a chassis and a battery in a battery compartment supported by the chassis. The dual underside battery cooling system transfers heat from the battery by drawing hot air from the battery compartment via air outlets. To do so, the dual underside battery cooling system includes a left fan for generating a left airflow along a left underside path of the vehicle and a right fan for generating a right airflow along a right underside path of the vehicle, the left and right airflows expelling the hot air from the battery compartment toward a rear of the vehicle. The processor is configured to independently control the left fan and the right fan to selectively generate a differential downforce on left and right wheels of the vehicles when cornering to thereby compensate for centrifugal roll and to generate an equal downforce on the left and right wheels when accelerating in a straight line. Optionally, a vehicle dynamics prediction module predicts a vehicle dynamics condition and generates control signals to control the left and right fans pre-emptively such that control of the left and right fans begins prior to the vehicle dynamics condition occurring. Alternatively, or additionally, the vehicle includes a vehicle dynamics sensor to sense a vehicle dynamic condition and to generate control signals to control the left and right fans in response to the vehicle dynamics sensor sensing the vehicle dynamics condition. The air outlets comprise a plurality of movable louvers disposed along the underside of the battery, the movable louvers being movable between a closed position and an open position in which air may be vented from the battery compartment which may open forwardly or rearwardly, i.e. the louvers when open may be slanted forwardly or rearwardly.

The electric vehicle described above may be an autonomous electric vehicle comprising a body and a battery in a battery compartment within the body. As described above, the dual underside battery cooling system is provided to transfer heat from the battery by drawing hot air from the battery compartment via air outlets, the dual underside battery cooling system including a left fan for generating a left airflow along a left underside path of the vehicle and a right fan for generating a right airflow along a right underside path of the vehicle, the left and right airflows expelling the hot air from the battery compartment toward a rear of the vehicle. The vehicle includes a vehicle dynamics prediction module executed by a processor to predict a vehicle dynamics condition and to generate control signals to control the left and right fans pre-emptively prior to the vehicle dynamics condition occurring. The processor independently controls the left fan and the right fan to generate a differential downforce on left and right wheels of the vehicles when cornering to thereby compensate for centrifugal roll. Optionally, the processor causes the left and right fans to generate an equal downforce on the left and right wheels when accelerating in a straight line. The air outlets may comprise a plurality of movable louvers disposed along the underside of the battery, the movable louvers being movable between a closed position and an open position in which air may be vented from the battery compartment. In one implementation, the autonomous electric vehicle includes two different sets of louvers, e.g. a first plurality of left movable louvers disposed along the left underside of the battery and a second plurality of right movable louvers disposed along the right underside of the battery, the left movable louvers being independently movable of the right movable louvers. The left and right movable louvers may be independently deployed to generate a drag-induced yaw effect when braking and cornering.

In another aspect, a method of cooling a battery of an electric vehicle comprises drawing heat from a battery compartment or from a heat exchanger associated with the battery or battery compartment using dual fans that displace air underneath the vehicle while also generating a differential downforce by evacuating air from beneath the vehicle to compensate for centrifugal roll of the vehicle. The method may be performed by a processor or controller onboard the vehicle that controls the left and right fans.

In one embodiment, the method entails controlling the dual fans 52, 54 of the battery cooling system 50 in conjunction with a vehicle heating, ventilation and air conditioning (HVAC) system 40 that is provided in the vehicle for climate control of the passenger cabin. Waste heat from the battery 30 may be used to heat the cabin. The fans may be deactivated or slowed when the HVAC system of the vehicle calls for heat to be delivered to the cabin. The method may entail sending a signal from the HVAC controller 130 of the HVAC system 40 to the battery cooling system 50 or to the battery cooling controller 125. Alternatively, the method may entail the processor receiving signals from the HVAC controller 130 and from the battery cooling controller 125 and then determining how much cooling or heating to provide to each of the battery and the passenger cabin. The method may further entail the processor controlling the battery cooling system 50 based on the signals received from the HVAC controller 130 and the battery cooling controller 125 as well as the vehicle dynamics prediction module 105. Thus, in this embodiment, the processor performs a battery cooling method by activating and deactivating the fans 52, 54 and/or by setting fan speeds of the fans 52, 54 in response to the signals received from the HVAC controller 130, battery cooling controller 125 and vehicle dynamics prediction module 105. A related system that may be adapted for use with this embodiment are disclosed in U.S. Pat. Nos. 10,457,111 and 9,780,422 which are incorporated herein by reference.

Figure 21:
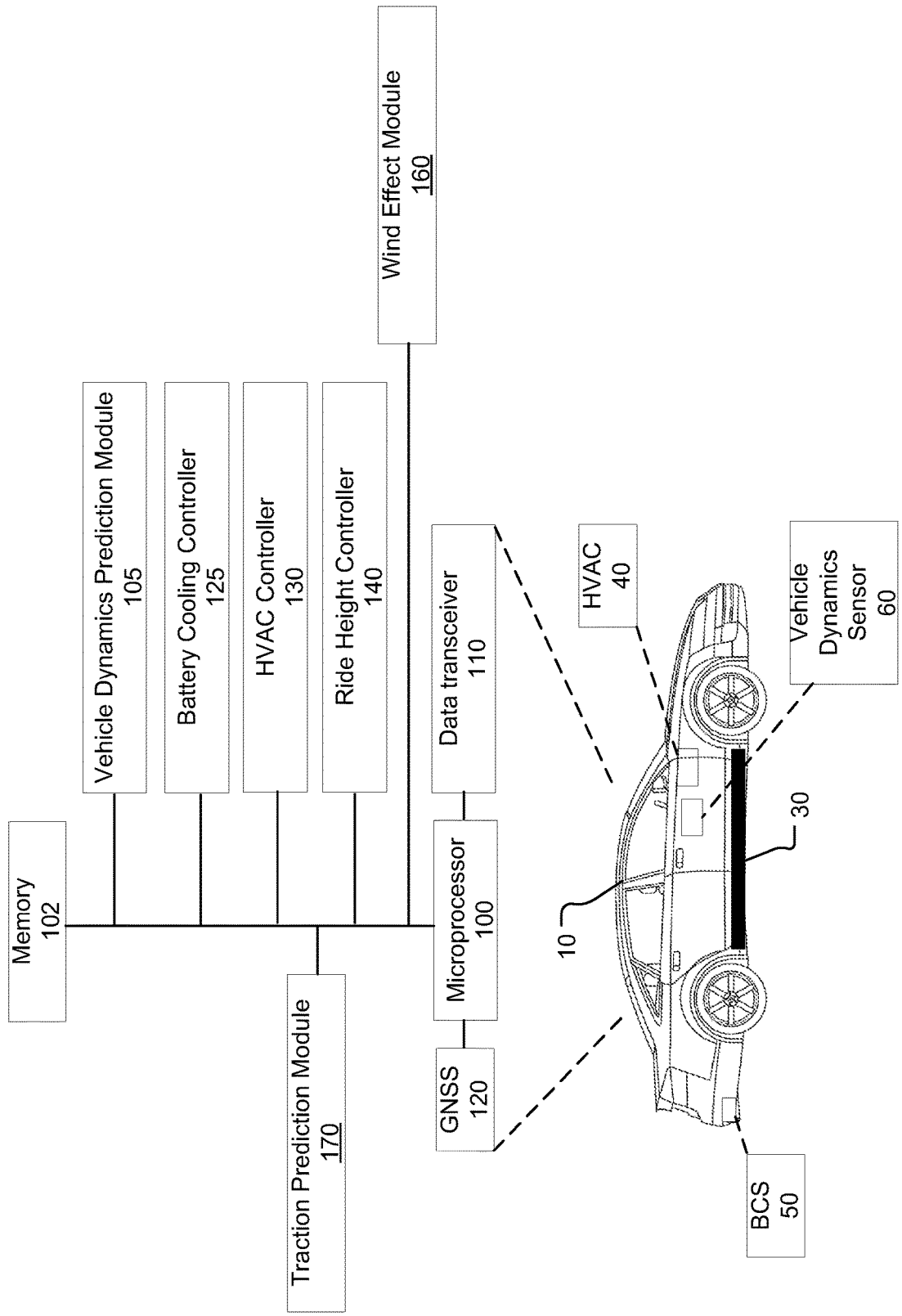
FIG. 21 is side view of a vehicle having a wind effect module for determining wind-induced roll, pitch and yaw to be compensated by the downforce-generating fan system of the vehicle.

In the embodiment depicted in FIG. 21, the vehicle 10 has a wind effect module 160 executed by a processor such as the processor 100. The wind effect module 160 is configured to receive wind speed and wind direction data (i.e. wind speed measurements and wind direction measurements) from wind sensors (e.g. air speed sensors such as pitot tubes) and to compute the aerodynamic effect of the wind on the vehicle using an aerodynamic model of the vehicle in order to determine how the wind blowing on the vehicle is exerting forces and moments on the vehicle. The wind effect module 160 thus determines the net wind effect on the vehicle 10. The net wind effect may be expressed in terms of forces and/or moments acting on the vehicle. The wind effect module 160 can then resolve the net wind effect forces and moments into vector components or constituent elements, e.g. wind-induced roll, wind-induced yaw and wind-induced pitch. The processor 100 of the vehicle 10 can use the wind effects determined by the wind effect module 160 to regulate the speed of the downforce-generating fans to generate counteracting downforces on the left and right sides of the vehicle to offset the wind-induced roll and/or the wind-induced yaw. The vehicle 10 can also use the downforce-generating fans to vary the downforce on the front of the vehicle compared to the downforce on the rear of the vehicle in order to offset wind-induced pitch.

Figure 22:
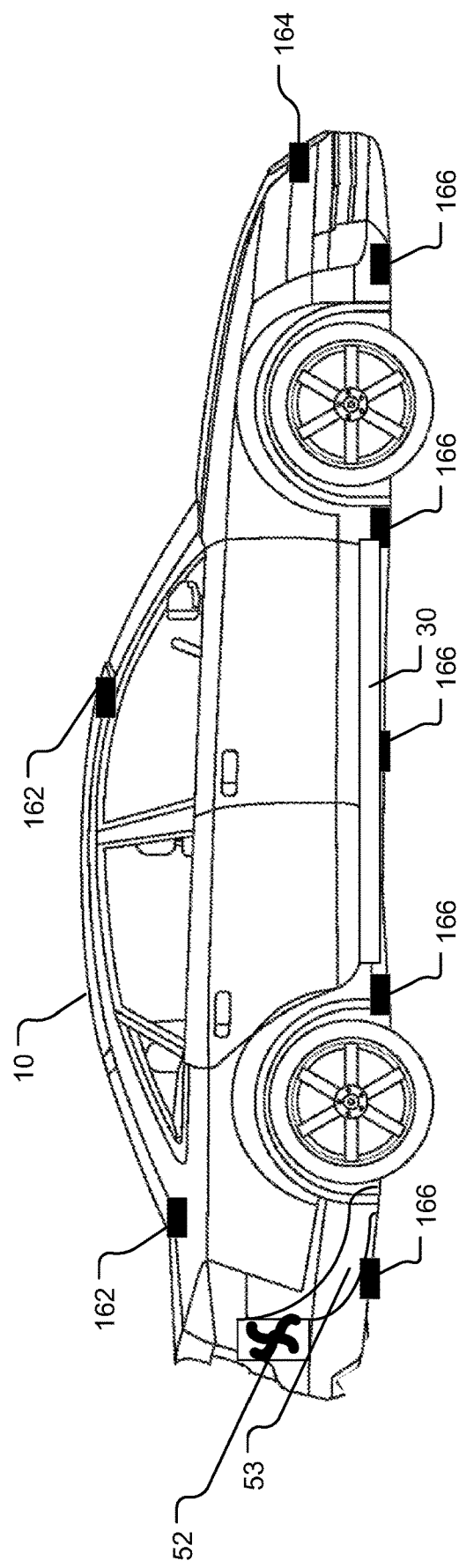
FIG. 22 is side view of a vehicle having a plurality of pitot tubes as examples of airflow sensors that are provided on the vehicle for cooperating with the wind effect module.

FIG. 22 depicts a vehicle 10 having a plurality of pitot tubes as air speed sensors and/or air pressure sensors. In this figure, the vehicle 10 may optionally has multiple pitot tubes 162, 164, 166 to measure air speed and/or air pressure at multiple locations on or under the vehicle. For example, the vehicle 10 may have one or more upper pitot tubes 162 mounted om the upper portion of the body of the vehicle 10 to measure air pressure on the top of the vehicle, one or more front pitot tubes 164 mounted on the front portion of the body of the vehicle 10 to measure air pressure at the front of the vehicle, and one or more underside pitot tubes 166 mounted on the underside the vehicle 10 to measure the air pressure under the vehicle. Alternatively or additionally, left-side pitot tubes and right-side pitot tubes may be mounted to the left and right sides of the top and underside of the vehicle to measure both upper and lower left-side air pressure and upper and lower right-side air pressure in order to determine or estimate the left-side downforce and the right-side downforce. Determining a differential air pressure between the upper portion of the vehicle and the underside of the vehicle enables calculation or at least estimation by the processor of the net aerodynamic force on the vehicle (e.g. in the vertical direction), i.e. the net downforce acting on the vehicle under particular aerodynamic conditions. More specifically, the net left-side downforce and the new right-side downforce may be determined. The downforce-generating fans can then be controlled by the processor to adjust the left downforce and the right downforce to achieve the desired vehicle dynamics, e.g. to counteract unwanted roll and/or pitch and/or yaw.

In a further embodiment, the wind effect module 160 may predict the expected net wind effect on the vehicle 10 at a future location of the vehicle based on a predicted travel path of the vehicle. In this case, the vehicle 10 may be an autonomous vehicle navigating autonomously. In such a case, future locations along the route are known in advance. Wind data for one or more upcoming locations may be downloaded from a server or communicated from another vehicle that traveling ahead of the vehicle 10. Predicted wind data (predicted wind speed and wind speed) for a future location is then used by the wind effect module 160 to calculate the predicted net wind effect on the vehicle or to calculate predicted wind-induced roll, yaw and pitch. Once this predicted wind effect or predicted wind-induced roll, yaw and pitch are computed, the vehicle can pre-emptively activate its downforce-generating fans so that the desired downforces are generated at exactly the time when the future location is reached. Thus the vehicle may continually download upcoming wind data, compute predicted wind effects, and continually adjust its downforce-generating fans to vary the amount of downforce to continually offset the changing wind effects on the vehicle. The changing wind effects are due to the combination of the changing winds themselves and the vehicle changing heading and speed. The changing wind effects may also be due to the state of vehicle windows and sunroofs. In other words, if one or more windows are open and/or the sunroof is open, this will affect the aerodynamics of the vehicle and how the wind affects the vehicle. The wind effect module 160 may thus be configured to receive window state signals indicative of whether one or more windows are open or closed and, if so, which ones and by how much. Similarly, the wind effect module 160 may be configured to receive sunroof (or moonroof) state signals indicative of whether a sunroof (or moonroof) is open or closed and, if open, by how much. Similarly, for a cabriolet or convertible vehicle with a closable roof, the wind effect module 160 may be configured to receive a roof state signal indicative of whether the roof is up or down. Similarly, for a vehicle with a deployable or adjustable rear spoiler, air dam, splitter, or other movable aerodynamic surface, the wind effect module 160 may be configured to receive a spoiler state signal indicative of whether the spoiler or other movable aerodynamic surface is deployed or retracted and optionally also to what extent. The spoiler (or other movable aerodynamic surface), windows, sunroof, etc are all factors that the wind effect module 160 may use in determining the net wind effect on the vehicle. In one embodiment, the wind effect module 160 has aerodynamic models of the vehicle in various states to enable calculation of the net aerodynamic effect on the vehicle in whichever state the vehicle is operating. For example, the wind effect module 160 might have a first aerodynamic model for the vehicle with all windows closed and the sunroof closed, a second aerodynamic model for the vehicle with all windows closed but the sunroof open, and a third aerodynamic model for the vehicle with the front windows fully open, the rear windows fully closed and the sunroof open. Further aerodynamic models can be predetermined and stored in the wind effect module 160 for various conditions or states in which the front left, front right, rear left and rear right windows are fully open, partially open or closed and in which the sunroof is fully open, tilted, partially open or closed. The aerodynamic models for these different aerodynamic states of the vehicle are precomputed and stored in the wind effect module 160 for rapid and efficient calculation of net wind effect and/or wind-induced roll, pitch and yaw.

In a further embodiment, as further depicted in FIG. 21, the vehicle 10 includes a traction prediction module 170 communicatively connected to the processor 100. The traction prediction module 170 is configured to predict a roadway condition at a future location along the route that the vehicle is traveling. The traction prediction module 170 may obtain roadway condition data from a server or another vehicle ahead of the vehicle 10 along the roadway. The roadway condition data may, for example, indicate how slippery the road surface is. For example, it may indicate that the road is icy, snow-covered, wet, dry, etc. The roadway condition data may include a coefficient of friction for the road-tire interface. Based on this predicted roadway condition, the traction prediction module 170 of the vehicle 10 can predict the traction of the vehicle at that upcoming location, e.g. the traction of each of the four tires at a particular upcoming location, such as a sharp turn. The traction prediction module 170 can then determine if further downforce is needed or beneficial to enable the vehicle to safely drive over the roadway at that point. For example, this may be a sharp turn on a sinuous icy mountain road. The traction prediction module 170 may estimate a frictional force on each tire for the expected coefficient of friction of the roadway and then compute a lateral force on each tire due to the centrifugal force acting on the vehicle as function of speed and radius of curvature. The traction prediction module 170 may then determine if the frictional force is sufficient to prevent the tire from slipping laterally. Optionally, the traction prediction module 170 may apply a safety factor in comparing the frictional force to the lateral force for each tire to ensure that the vehicle is safely able to turn the corner without slipping. Optionally, the safety factor is determined based on vehicle location, e.g. a high mountain road or densely populated urban environment should require a higher safety factor than a flat country road. If the traction prediction module 170 predicts that more traction is needed or beneficial, the traction prediction module 170 signals the processor to activate or increase the downforce-generating fans to produce more downforce and thus more traction on the vehicle when it takes the corner.

It will be appreciated that the processor 100 may cooperate simultaneously with both the traction prediction module 170 and the wind effect module 160. The processor 100 may also cooperate simultaneously with any of the other controllers or modules shown in FIG. 21 in any suitable combination to control the downforce-generating fans based on various factors such as wind, traction, battery state, HVAC, vehicle dynamics, and ride height.

Furthermore, a user setting may be used to control the extent to which the downforce-generating fans operate. The vehicle may have a user interface element to enable the user to activate or deactivate the downforce-generating fans or to select the degree to which they influence vehicle dynamics. The downforce-generating fans may be activated as part of a sport mode and deactivated as part of an economy mode or comfort mode.

In the specific example of FIG. 22, the vehicle 10 is shown with a downforce-generating fan 52 connected to a duct 53 that leads to an air opening on an underside of the vehicle in order to draw air from beneath the vehicle. In this particular arrangement, the fan 52 is positioned above the battery 30. In other embodiments, the fan 52 may be disposed elsewhere, for example, at approximately the same level as the battery as depicted, for example, in FIG. 8.

These methods can be implemented in hardware, software, firmware or as any suitable combination thereof. That is, if implemented as software, the computer-readable medium comprises instructions in code which when loaded into memory and executed on a processor of a tablet or mobile device causes the tablet or mobile device to perform any of the foregoing method steps. These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. An electric vehicle comprising:
   a chassis;
   a battery supported by the chassis;
   a dual underside battery cooling system to transfer heat from the battery, the dual underside battery cooling system including a left fan for generating a left airflow along a left underside path of the vehicle and a right fan for generating a right airflow along a right underside path of the vehicle, the left and right airflows transferring heat from the battery; and
   a processor for independently controlling the left fan and the right fan to selectively generate a differential downforce on left and right wheels of the vehicles when cornering to thereby compensate for centrifugal roll and to generate an equal downforce on the left and right wheels when accelerating in a straight line.

2. The electric vehicle of claim 1 comprising a vehicle dynamics prediction module to predict a vehicle dynamics condition and to generate control signals to control the left and right fans pre-emptively such that control of the left and right fans begins prior to the vehicle dynamics condition occurring.

3. The electric vehicle of claim 1 comprising a vehicle dynamics sensor to sense a vehicle dynamic condition and to generate control signals to control the left and right fans in response to the vehicle dynamics sensor sensing the vehicle dynamics condition.

4. The electric vehicle of claim 1 comprising a plurality of movable louvers disposed along the underside of the battery, the movable louvers being movable between a closed position and an open position in which air may be vented from a space surrounding the battery.

5. The electric vehicle of claim 4 wherein the movable louvers open rearwardly.

6. The electric vehicle of claim 4 wherein the movable louvers open forwardly to create aerodynamic drag when braking.

7. The electric vehicle of claim 6 wherein the movable louvers open only if the electric vehicle detects that a road ahead is dry and clean.

8. The electric vehicle of claim 4 wherein the movable louvers comprise heat-exchanger coils through which a coolant flows.

9. The electric vehicle of claim 1 comprising a plurality of left movable louvers disposed along the left underside of the battery and a plurality of right movable louvers disposed along the right underside of the battery, the left movable louvers being independently movable of the right movable louvers.

10. The electric vehicle of claim 9 wherein the left and right movable louvers are independently deployed to generate a drag-induced yaw effect when braking and cornering.

11. The electric vehicle of claim 1 comprising a central divider to divide the left and right airflows to thereby define the left and right underside paths.

12. The electric vehicle of claim 1 wherein the processor is configured to also control left and right front air intakes disposed in a forward portion of the body of the vehicle, wherein the processor opens the left front air intake when the left fan is activated and opens the right front air intake when the right fan is activated.

13. A electric vehicle comprising:
a chassis;
a battery in a battery compartment supported by the chassis;
a dual underside battery cooling system to transfer heat from the battery by drawing hot air from the battery compartment via air outlets, the dual underside battery cooling system including a left fan for generating a left airflow along a left underside path of the vehicle and a right fan for generating a right airflow along a right underside path of the vehicle, the left and right airflows expelling the hot air from the battery compartment toward a rear of the vehicle; and
a processor for independently controlling the left fan and the right fan to selectively generate a differential downforce on left and right wheels of the vehicles when cornering to thereby compensate for centrifugal roll and to generate an equal downforce on the left and right wheels when accelerating in a straight line.

14. The electric vehicle of claim 13 comprising a vehicle dynamics prediction module to predict a vehicle dynamics condition and to generate control signals to control the left and right fans pre-emptively such that control of the left and right fans begins prior to the vehicle dynamics condition occurring.

15. The electric vehicle of claim 13 comprising a vehicle dynamics sensor to sense a vehicle dynamic condition and to generate control signals to control the left and right fans in response to the vehicle dynamics sensor sensing the vehicle dynamics condition.

16. The electric vehicle of claim 13 wherein the air outlet comprise a plurality of movable louvers disposed along the underside of the battery, the movable louvers being movable between a closed position and an open position in which air may be vented from the battery compartment.

17. An autonomous electric vehicle comprising:
a body;
a battery in a battery compartment within the body;
a dual underside battery cooling system to transfer heat from the battery by drawing hot air from the battery compartment via air outlets, the dual underside battery cooling system including a left fan for generating a left airflow along a left underside path of the vehicle and a right fan for generating a right airflow along a right underside path of the vehicle, the left and right airflows expelling the hot air from the battery compartment toward a rear of the vehicle; and
a vehicle dynamics prediction module executed by a processor to predict a vehicle dynamics condition and to generate control signals to control the left and right fans pre-emptively prior to the vehicle dynamics condition occurring, wherein the processor independently controls the left fan and the right fan to generate a differential downforce on left and right wheels of the vehicles when cornering to thereby compensate for centrifugal roll.

18. The autonomous electric vehicle of claim 17 wherein the processor causes the left and right fans to generate an equal downforce on the left and right wheels when accelerating in a straight line.

19. The autonomous electric vehicle of claim 17 wherein the air outlet comprise a plurality of movable louvers disposed along the underside of the battery, the movable louvers being movable between a closed position and an open position in which air may be vented from the battery compartment.

20. The autonomous electric vehicle of claim 17 comprising a plurality of left movable louvers disposed along the left underside of the battery and a plurality of right movable louvers disposed along the right underside of the battery, the left movable louvers being independently movable of the right movable louvers, wherein the left and right movable louvers are independently deployed to generate a drag-induced yaw effect when braking and cornering.

* * * * *